(12) United States Patent
Cullen

(10) Patent No.: US 7,437,201 B2
(45) Date of Patent: Oct. 14, 2008

(54) ELECTRIC MOTOR CONTROLLER

(76) Inventor: Christopher P. Cullen, 21 Arrowhead Trail, Ipswich, MA (US) 01938

( * ) Notice: Subject to any disclaimer, the term of this patent is extended or adjusted under 35 U.S.C. 154(b) by 1283 days.

(21) Appl. No.: 10/341,953

(22) Filed: Jan. 14, 2003

(65) Prior Publication Data
US 2004/0135534 A1 Jul. 15, 2004

(51) Int. Cl.
G05B 13/02 (2006.01)
G06F 7/60 (2006.01)

(52) U.S. Cl. .............. 700/29; 700/30; 700/31; 703/2

(58) Field of Classification Search ......... 700/29–31; 718/1, 100–108; 318/254, 439, 561; 703/2; 640/825–825.9; 388/904
See application file for complete search history.

(56) References Cited

U.S. PATENT DOCUMENTS

| | | | | |
|---|---|---|---|---|
| 4,287,461 A | * | 9/1981 | Promis et al. ............... 318/571 |
| 4,368,411 A | * | 1/1983 | Kidd ......................... 318/254 |
| 4,772,831 A | | 9/1988 | Casler, Jr. et al. |
| 4,779,031 A | * | 10/1988 | Arends et al. ............... 318/565 |
| 4,990,838 A | | 2/1991 | Kawato et al. |
| 5,130,933 A | | 7/1992 | Kitano |
| 5,138,564 A | | 8/1992 | de Jong et al. |
| 5,237,521 A | | 8/1993 | Raj et al. |
| 5,331,264 A | * | 7/1994 | Cheng et al. ........... 318/568.11 |
| 5,426,722 A | | 6/1995 | Batchelder |
| 5,432,502 A | | 7/1995 | Johnson, Jr. |
| 5,469,414 A | * | 11/1995 | Okamura ................. 360/78.06 |
| 5,475,291 A | * | 12/1995 | Yoshida et al. ......... 318/568.22 |
| 5,495,158 A | | 2/1996 | Schmidt et al. |
| 5,533,166 A | | 7/1996 | Yoshida et al. |
| 5,546,014 A | | 8/1996 | Haussecker |
| 5,834,918 A | * | 11/1998 | Taylor et al. ................. 318/601 |
| 5,880,416 A | * | 3/1999 | Colby et al. ................. 187/393 |
| 5,909,018 A | | 6/1999 | Vecchiotti et al. |
| 5,923,132 A | * | 7/1999 | Boyer ........................... 318/34 |
| 5,929,400 A | | 7/1999 | Colby et al. |
| 5,969,499 A | | 10/1999 | Shaffer |

(Continued)

FOREIGN PATENT DOCUMENTS

EP 0 638 988 2/1995

(Continued)

OTHER PUBLICATIONS

Horst Kuchilling, "Nachschlagebücher für Grundlagenfächer Physik", VEB Fachbuchverlag Leipzig, GDR, XP002311957, pp. 61-69 (1989).

(Continued)

*Primary Examiner*—Albert DeCady
*Assistant Examiner*—Jennifer L Norton
(74) *Attorney, Agent, or Firm*—Occhiuti Rohlicek & Tsao LLP

(57) ABSTRACT

A control system for any type of electric motor that automatically learns the characteristics of the motor and computes a motor model for the motor. The control system uses the computed motor model to produce a closed-loop control design that achieves a particular resolution. The control system also uses the motor model to automatically construct efficient motion profiles for a variety of motion commands. The control system may also include an encoder interface device that provides highly accurate motor position information.

25 Claims, 11 Drawing Sheets

U.S. PATENT DOCUMENTS

| | | | |
|---|---|---|---|
| 5,998,957 A * | 12/1999 | Tadmor et al. | 318/701 |
| 6,018,087 A | 1/2000 | Masahiro | |
| 6,049,739 A | 4/2000 | Melvin | |
| 6,081,087 A | 6/2000 | Iijima et al. | |
| 6,081,751 A | 6/2000 | Luo et al. | |
| 6,121,748 A | 9/2000 | Yamakawa et al. | |
| 6,298,393 B1 | 10/2001 | Hopsecger | |
| 6,326,758 B1 | 12/2001 | Discenzo | |
| 6,363,300 B1 | 3/2002 | Inga | |
| 6,366,049 B1 | 4/2002 | Chen et al. | |
| 6,445,961 B1 | 9/2002 | Melvin | |
| 6,495,791 B2 | 12/2002 | Hunter et al. | |
| 6,556,892 B2 * | 4/2003 | Kuroki et al. | 700/245 |
| 6,838,855 B2 * | 1/2005 | Kobayashi et al. | 318/800 |
| 6,992,454 B2 * | 1/2006 | Tsuruta | 318/561 |
| 7,101,310 B2 * | 9/2006 | Smith et al. | 477/98 |
| 2001/0052512 A1 | 12/2001 | Hunter et al. | |
| 2002/0022903 A1 | 2/2002 | Krah et al. | |
| 2002/0093303 A1 | 7/2002 | Lo | |
| 2008/0052049 A1 * | 2/2008 | Moriyama et al. | 703/2 |

FOREIGN PATENT DOCUMENTS

| | | |
|---|---|---|
| GB | 604598 | 1/1948 |
| WO | WO 02/100605 | 12/2002 |

OTHER PUBLICATIONS

Chalupa et al., Application of Simple Self-Tuning Controllers in Decentralized Control, Proceedings of the 2002 IEEE International, pp. 1276-1281, 2002.

Ravichandran and Karray, Knowledge Based Approach for Online Self-Tuning of PID-Control, Proceedings of the American Control Conference, pp. 2846-2851, 2001.

Tan et al., High Precision Linear Motor Control via Relay-Tuning and Iterative Learning Based on Zero-Phase Filtering, IEEE Transactions on Control systems Technology, 9:244-253, 2001.

Wang et al., Neural-Network-Based Self-Tuning PI Controller for Precise Motion Control of PMAC Motors, IEEE Transactions on Industrial Electronics, 48:408-415, 2001.

Ahmed et al., Neuro-Controller for High Performance Induction Motor Drivers in Robots, IEEE, pp. 2082-2087, 2001.

Tian et al., An Optimal Self-Tuning PID Controller Considering Parameter Estimation Uncertainty, IEEE, pp. 3107-3111, 2000.

Yaacob et al., Real Time Self Tuning controller For Induction Motor Based on Pi Method, SICE, pp. 909-914, 1999.

Cha et al., The Auto-tuning PID controller using the Parameter Estimation, IEEE, pp. 46-51, 1999.

Tzou et al., Auto-Tuning control of Self-Commissioning Electronics Drives, National Science Council, pp. 483-487, 1997.

Press et al., "Numerical Recipes in C: The Art of Scientific Computing", *Cambridge University Press*, 2$^{nd}$ ed., pp. 189 and 650-655, 1992.

* cited by examiner

| | Item | Quadratic ⌢ | Harmonic ⌢ |
|---|---|---|---|
| 700 | Acceleration | $a(t) = \frac{4At}{T}\left(1 - \frac{t}{T}\right)$ | $a(t) = \frac{A}{2}\left(1 - \cos\frac{2\pi}{T}t\right)$ |
| 701 | Velocity | $v(t) = v_i + \left(2\frac{t}{T} - \frac{4}{3}\left(\frac{t}{T}\right)^2\right)At$ | $v(t) = v_i + \frac{A}{2}t - \frac{AT}{4\pi}\sin\frac{2\pi t}{T}$ |
| 702 | Position | $p(t) = p_i + v_i t + \frac{2A}{3T}t^3 - \frac{A}{3T^2}t^4$ | $p(t) = p_i + v_i t + \frac{A}{4}t^2 + \frac{AT^2}{8\pi^2}\left(\cos\frac{2\pi t}{T} - 1\right)$ |
| 703 | Jerk | $j(t) = \frac{4A}{T}\left(1 - \frac{2t}{T}\right)$ | $j(t) = \frac{\pi A}{T}\sin\frac{2\pi t}{T}$ |
| 704 | Single Pulse Velocity Change | $\Delta v = \frac{2}{3}AT$ | $\Delta v = \frac{AT}{2}$ |
| 705 | Single Pulse Distance | $\Delta p = Tv_i + \frac{AT^2}{3}$<br>$= Tv_f - \frac{AT^2}{3}$ | $\Delta p = Tv_i + \frac{AT^2}{4}$<br>$= Tv_f - \frac{AT^2}{4}$ |
| 706 | Step Motion | $\Delta p = \frac{2}{3}AT^2$ | $\Delta p = \frac{AT^2}{2}$ |
| 707 | RMS Acceleration | $A_{RMS} = A\sqrt{\frac{8}{15}} \approx 0.7303\ A$ | $A_{RMS} = \sqrt{\frac{3}{8}}A \approx A \cdot 0.612$ |
| 708 | Max Pulse Output Time (must also check at t=0, t=T) | $t = \frac{T}{2} - \frac{k_a}{k_v} \pm \frac{T}{2k_v}\sqrt{k_v^2 + \frac{4}{T^2}(k_a^2 - 2k_j k_v)}$ | $t = \frac{T}{\pi}\tan^{-1}\left(\frac{C_s \pm \sqrt{C_s^2 + C_c^2 - C_0^2}}{C_c + C_0}\right)$<br>$C_s = \frac{Ak_a}{2}$<br>$C_c = \frac{\pi A k_j}{T} - \frac{AT k_v}{4\pi}$<br>$C_0 = -\frac{AT k_v}{4\pi}$ |

Fig. 7

(prior art)

ELECTRIC MOTOR CONTROLLER

BACKGROUND

Closed-loop motor controllers often require a user to enter numerous parameters in order to specify, for example, closed-loop feedback control gains, motion profile constraints and shaping parameters. This process may be time consuming and require expertise in the motor control field in order to achieve desirable motor control. Accordingly, a controller that self-determines a motor model for the particular motor, automatically computes closed-loop gains, and automatically generates efficient motion profiles in response to a motion command may be desirable.

Estimating parameters of a system model is a known academic field. Typically, however, it is applied at the research and development stage, to develop a better control system for a fixed product; for example, the software package System Identification Toolbox™ from The Mathworks in Natick, Mass., is a tool for expert engineers to process signals obtained from a machine (e.g. motor) and estimate the motor model.

Many motor control vendors provide software packages to assist the user in setting up and configuring the motor. Some examples are CME2™ from Copley Controls in Canton, Mass., Motioneering™ from Kollmorgen in Radford, Va., WSDK Servo Design Kit™ from Galil Motion Control in Rocklin, Calif., and PEWIN™ from Delta Tau Systems in Chatsworth, Calif. These products all require knowledge of motor parameters, and require the engineer to engage in iterative experiments to determine system parameters. In contrast, the operation of a controller designed in accordance with the teachings set forth below is invisible to the user(s), requires little expertise, and no parameters need to be supplied. Also, a controller designed in accordance with the teachings set forth below generates motion profile parameters for efficient motion control.

SUMMARY

In one aspect, the invention features a method for adapting a controller for a motor in which a control signal is applied that causes the motor to change position over time. The control signal and resulting position information is recorded over a period of time. Derivatives of position are estimated based on the recorded position information, and a motor model is computed in which derivatives of position are fit into a motor model equation that relates the control signal to the motion of the motor. The computer motor model is then supplied to the controller.

Embodiments may include one or more of the following features. The control signal applied to the motor may include applying a modulation signal to a modulator and modulating the output of a power source in response to the modulation signal to produce a motor control signal. The step of recording the control signal over a period of time may include recording the modulation signal applied to the modulator. The modulator may be configured as a current controller or a voltage controller.

The method may further include recording current feedback generated by the modulator in response to the motor control signal applied to the motor and fitting the derivatives of position into an equation that relates the current feedback to the motion of the motor. The step of applying a control signal may include transforming a modulation signal into two or more motor phase modulation signals.

The step of recording position of the motor over a period of time may include sensing a discrete change in motor position and storing a motor position value and an indication of the time corresponding to when the change in position occurred. The step of recording position of the motor over a period of time may include recording, at regular intervals, a motor position value and the time corresponding to when the last change in position occurred.

Estimating a plurality of derivatives of position may include selecting a set of recorded position and corresponding time data values and then fitting the selected set of recorded position and time data values into a polynomial that represents position as a function of time. Prior to fitting the recorded position and time data values, the method may include conditioning the time values such that the plurality of selected time values have a mean of approximately zero and a variance substantially equal to one. Fitting the derivatives of position into an equation which relates the control signal to the motion of the motor may include computing a least squares fit of the plurality of derivatives of position and corresponding control signal values into an equation that relates the control signal to motion of the motor. Prior to fitting the derivatives of position into an equation, the method may include conditioning the set of values for each derivative of position such that each set of values has a mean of approximately zero and a variance substantially equal to one.

The step of estimating a plurality of derivatives of position may include recording a plurality of motor positions and a corresponding time associated with each position and estimating a velocity based on at least two recorded motor positions and the associated times and/or estimating acceleration based on at least three recorded motor positions and the associated times.

The step of estimating a plurality of derivatives of position may include recording a plurality of motor positions and a corresponding time associated with each position, fitting a describing function to the plurality of motor positions and corresponding times, and deriving a plurality of derivatives of position from the describing function.

The method may further include computing a closed-loop control based on the computed motor model. The step of computing a closed-loop control may include determining a desired resolution value for the correction signal for each controlled variable, assigning a gain of the controller to the desired resolution value, calculating a frequency value for the gain set to the desired resolution value, and computing the remaining gains of the controller.

The step of computing a closed-loop control based on the computed motor model may include assigning a plurality of proportional gains of the closed-loop control to a desired resolution value, calculating a frequency value for each proportional gain set to the desired resolution value, selecting the smallest frequency value calculated, and using the selected frequency value, computing the remaining gains of the controller. The step of computing a closed-loop control may include setting a gain associated with a state variable of the closed-loop control to achieve a desired resolution for that state variable.

The method may further include determining a maximum feedforward signal. The step of determining a maximum feedforward signal may include selecting an initial value for the maximum feedforward signal, performing a motion function using the selected value, recording the motor control signal used to perform the motion function, comparing the peak value of the modulation signal used to perform the motion function with a predetermined range, and if the peak value of modulation signal used to perform the motion function falls outside the predetermined range, then selecting a different value for the maximum feedforward signal and repeating the steps of performing the motion function, recording the modulation signal and comparing the modulation signal.

In another aspect, the invention features a method for controlling a motor with a controller that includes receiving a command to perform a motor function from a user, accessing a predetermined motor model and maximum feedforward signal, determining a set of motion profile parameters based on a predetermined motor model and a predetermined maximum feedforward signal, and supplying the motion profile parameters to a controller to generate the motor control signal specified by the motion profile parameters.

Embodiments may include one or more of the following features. The method may also include computing a set of motion profile parameters, modifying the set of motion profile parameters in a predetermined format, and supplying the modified set of motion profile parameters to a controller.

The motor control signal generated from the set of motion profile parameters may include a series of values corresponding to motor positions, velocity, and acceleration at discrete times.

The method may further include selecting an acceleration pulse form, such as a quadratic, harmonic, trapezoidal, piecewise linear, or cycloidal acceleration pulse, or selecting a motion plan algorithm, such as a pulse-cruise-pulse algorithm, a balanced pulse-cruise-pulse algorithm, or a balanced pulse-pulse algorithm.

The motion profile parameters may include a sequence of acceleration pulses, each pulse specified in terms of duration and peak acceleration, or a set of peak jerk, peak velocity, and peak acceleration values.

The step of determining a set of motion profile parameters based on a predetermined motor model and maximum feedforward signal may include selecting an initial set of motion profile parameters, computing a peak feedforward signal using the initial set of motion profile parameters, comparing the computed peak feedforward signal to the predetermined maximum feedforward signal, and if the computed peak feedforward signal is not within a predetermined amount of the predetermined maximum feedforward signal, then iteratively selecting other sets of motion profile parameters until a set of motion profile parameters produces a computed peak feedforward signal that is within a predetermined amount of the predetermined maximum feedforward signal.

In another aspect, the invention features a method for determining a plurality of gains associated with a plurality of variables of a closed-loop controller that includes the steps of assigning a gain associated with one of the controller variables to a desired resolution value, calculating a frequency value for the gain set to the desired resolution value, computing the remaining gains of the controller, and supplying the gains to the closed-loop controller.

Embodiments may include one or more of the following features. The closed-loop controller may be a proportional-integral-derivative controller and the assigned gain comprises a proportional gain. The method may further include assigning a plurality of proportional gains of the closed-loop controller to the desired resolution value, calculating a frequency value for each proportional gain set to the desired resolution value, selecting the smallest frequency value calculated, and using the selected frequency value, computing the remaining gains of the controller.

The step of computing the remaining gains of the controller may include computing an integral gain, determining a second resolution value of the controller using the computed integral gain and current servo sampling rate, and if the second resolution value is greater than the desired resolution value, then adjusting the servo sampling rate to reduce the second resolution value to at or below the desired resolution value. The step of computing the remaining gains for the controller may also include determining the number of position error readings required as input in a boxcar derivative function in order to achieve a desired resolution.

In another aspect, the invention features a method for designing a closed-loop controller having a state variable and a gain associated with the state variable that includes the steps of selecting a desired resolution value for the state variable and computing a gain associated with the state variable that achieves the desired resolution.

Embodiments may include one or more of the following features. The closed-loop controller may have several state variables and a gain associated with each state variable, and the method may also include selecting a desired resolution value for each state variable and computing a gain associated with each state variable that achieves the desired resolution for that state variable. The step of computing a gain associated with each state variable that achieves the desired resolution may include calculating a frequency value for two or more gains set to the desired resolution value, selecting the smallest frequency value calculated, and computing the remaining gains of the controller using the selected frequency value.

In another aspect, the invention features a method for calculating a derivative estimate in a closed-loop controller which produces a derivative term at each servo processing interval, which includes the steps of recording three or more position error readings at different servo processing intervals, computing a derivative estimate by summing two or more of the position error readings and subtracting an equal number of different position error readings than were used in the summing step, and computing the derivative term based on the derivative estimate.

Embodiments may include one or more of the following features. The position error readings may be recorded at successive servo processing intervals.

In another aspect, the invention features a method for determining acceleration of a motor based on position information received from a position measuring device that includes receiving position information from the position measuring device, recording an indication of motor position when a change in the position information is sensed, recording an indication of the time at which the change in the position information occurred, and calculating acceleration based on at least three position recordings and corresponding time recordings.

Embodiments may include one or more of the following features. The step of recording an indication of motion position when a change in the position information is sensed may include changing the value of a counter based on the change in the position information. The counter may be incremented when the position information indicates a change in position in a first direction and decremented when the position information indicates a change in position in a second direction. The step of calculating acceleration based on at least three position recordings and corresponding time recordings may include fitting the position/time recordings into at least a second-order polynomial that relates motor position to time and computing the second derivative of the polynomial.

In another aspect, the invention features a method for determining jerk of a motor based on position information received from a position measuring device, recording an indication of motor position when a change in the position information is sensed, and recording an indication of the time at which the change in the position information occurred, and calculating jerk based on at least four position recordings and corresponding time recordings.

Embodiments may include one or more of the following features. The step of calculating jerk based on at least four position recordings and corresponding time recordings may include fitting the position/time recordings into at least a third-order polynomial that relates motor position to time and computing the third derivative of the polynomial.

In another aspect, the invention features a controller for an electric motor that includes a motor model computation module configured to compute a motor model equation that relates the motor control signal to the motion of the motor and a trajectory planning module configured to receive a motion function command and, in response to receiving a motion function command, compute a set of motion profile parameters based on the motor model equation and a predetermined fraction of the maximum motor control signal, such that the motion profile parameters describe a motion having a planned peak output approximately equal to a predetermined fraction of the maximum motor control signal.

Embodiments may include one or more of the following features. The controller may further include a trajectory generator module configured to receive the motion profile parameters and generate a signal to cause the motor to execute the motion function specified in the motion function command.

The controller may include a closed-loop control device configured to calculate position errors and adjust the motor control signal to compensate for calculated errors.

The controller may include a position-measuring interface device configured to receive the position feedback information and record a change in position and the time at which the change of position occurred.

Embodiments may have one or more of the following advantages.

One advantage of a control system designed in accordance with the present invention is simplification of the commissioning process for a controller. Traditionally, commissioning a controller requires an expert engineer to perform an iterative, manual, experimental process that requires additional equipment, instruments, and a priori motor and load parameter knowledge. A control system designed in accordance with the teaching of this invention automatically commissions the control system with minimal user input and thus eliminates many of the time-consuming and expensive procedures associated with traditional controller commissioning.

Another advantage of a control system designed in accordance with the present invention is that a control system may effectively control an unknown motor of essentially infinite variation and of several different types (e.g., DC brush, DC brushless, AC brushless, induction) with little or no user knowledge or expertise.

Another advantage of a control system designed in accordance with the present invention is the simplification of the motion planning task. Typically the design of motion profiles requires motor parameter knowledge and an expert engineer. Moreover, optimal parameters are often difficult or impossible to obtain, and so a conservative and compromise approach results in calculating a single set of non-optimal motion parameters. The present invention discloses a motion profile planning process that automatically computes efficient motion profiles with minimal user input. Thus, efficient motion profiles (in term of time, power consumption, or both) may be obtained quickly and easily for every motion command without expert engineering assistance.

Another advantage is that the closed-loop control design of a control system may be automatically computed. This eliminates the need for an expert engineer to design a closed-loop controller for a particular motor.

Another advantage of a control system designed in accordance with the present invention is improved controller performance over a manually-configured controller. For example, a control system may use a self-determined motor model to provide accurate feedforward during motion profiles, which reduces tracking error and settling time from a manually-configured system.

Another advantage of a control system designed in accordance with the present invention is that the parameters specified in the motor model do not correspond to physical parameters (e.g., torque or inertia) that are difficult to determine, but are specified by quantities proportional to a given derivative of motor position, e.g., velocity, acceleration, jerk, sign-of-velocity, and constant-offset coefficients.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 7 is a table containing two sets of equations that describe a quadratic and harmonic acceleration pulse.

Like reference symbols in the various drawings indicate like elements.

DETAILED DESCRIPTION

Figure 1:
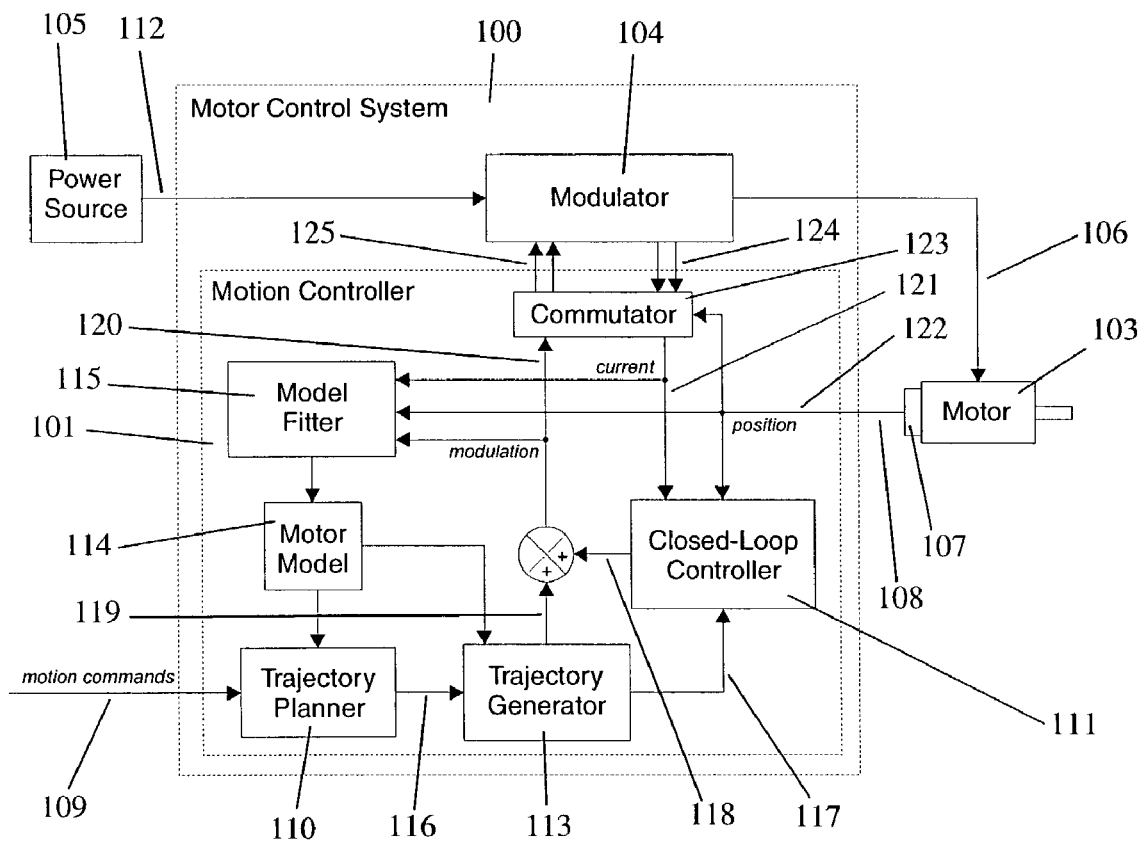
FIG. 1 is a block diagram of the logical components of a motor control system.

As shown in FIG. 1, a motor control system 100 includes motion controller 101 and modulator 104. Control system 100 is electrically coupled to a power supply 105, and modulator 104 is electrically coupled to a motor 103. Controller 101 controls the operation of the motor 103 by modulating the power source 105 into the motor windings. Modulator 104 may be configured as a voltage controller, in which case its modulation signal 120 is used to command a desired voltage, or as a current controller, in which case its modulation signal 120 is used to command a desired current. The commutator 123 transforms the modulation signal 120 to a set of motor phase modulation signals 125, using the measured motor position 122, or input from additional sensors such as Hall effect sensors (not shown) provided by the motor. The commutator 123 also transforms a set of measured motor phase currents 124 into an effective motor current feedback signal 121.

Motor 103 may be any type of electrical motor, including a DC brush, DC brushless, AC brushless, or induction motor. Motor 103 includes a position feedback generator 107 (e.g., an optical encoder) which produces signals indicating the current position of the motor. Feedback generated by position feedback generator 107 is fed into controller 101 via signal path 108. Controller 101 also receives motor function commands initiated by a user via signal path 109.

Controller 101 includes trajectory planner module 110, trajectory generator module 113, and closed-loop control 111. As will be explained in more detail below, the motor model 114 comprises motor model equations that mathematically describe the operation of the particular motor 103 connected to the control system 100. The motor model 114 is used by the trajectory planner 110 to compute a set of motion profile parameters 116 and the trajectory generator 113 to compute the feedforward signal 119 and to compute controller setpoints 117 supplied to the closed-loop control 111.

Trajectory planner 110 uses motor model 114 to compute a set of motion profile parameters 116 to perform a requested motion command 109. The trajectory generator 113 uses the motion profile parameters 116 and motor model 114 to produce a time-series sequence of feedforward signals 119 and controller setpoints 117. Closed-loop control 111 combines setpoints 117, position feedback 122, and current feedback 121 to produce correction signal 118. The correction signal 118 and feedforward signal 119 are combined to produce modulation signal 120. Modulation signal 120 specifies the fraction of power source 105 to be applied to the motor windings; the fraction is within the range of −1 to +1 (i.e. −100% to +100%), since the modulator 104 cannot produce more power than is available. At designated times, the model fitter 115 uses recorded sequences of position 122, current 121, and modulation signal 120 to recompute the motor model 114.

Figure 2:
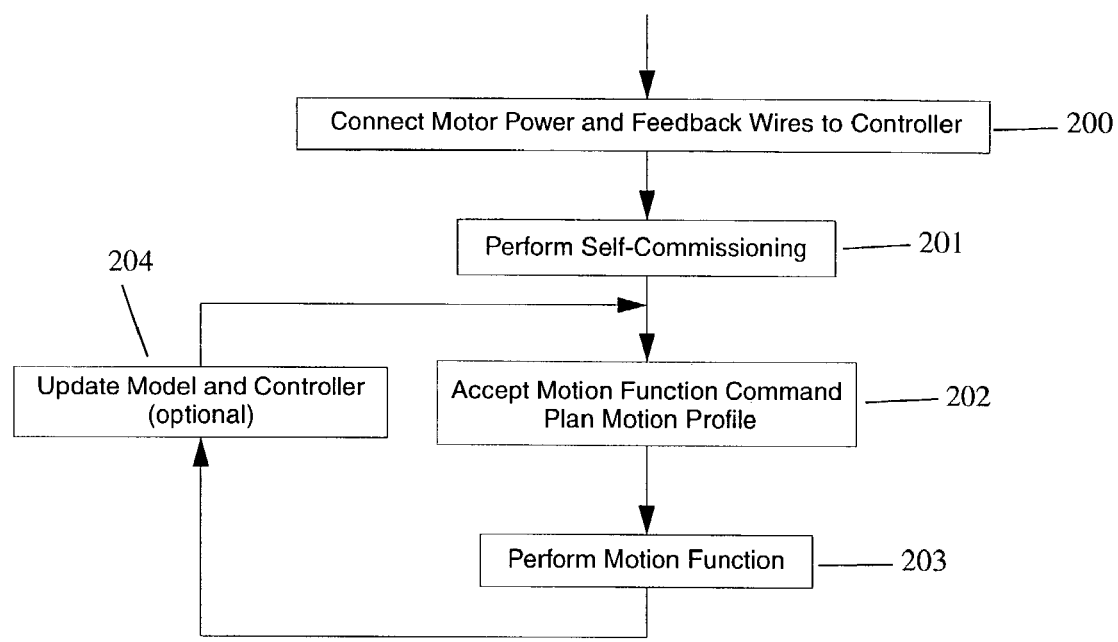
FIG. 2 is a flow chart illustrating the operation of the motor control system shown in FIG. 1.

As shown in FIG. 2, operation of motor control system 100 (shown in FIG. 1) is illustrated. In block 200, a user initially connects the motor control system 100 to the motor and power supply (i.e., connections 112, 106, 108 shown in FIG. 1). Control system 100 is configured such that a user may connect the controller-motor connections (e.g., connections 106, 108) in any particular manner. For example, the connection between the modulator 104 and motor 103 (i.e., connection 106) normally has either two or three leads. These leads may be connected in any order to the modulator 104. Similarly, the connection between the controller 101 and position feedback unit (i.e., connection 108) may contain the four signal wires A+, A−, B+, and B− for two optical encoder channels. The encoder channels A and B can be connected as B and A (e.g. A+ to B+, A− to B−, and B+ to A+, B− to A−), and either channel's differential wires (if used) can be connected backwards (for example A+ to A− and A− to A+, instead of A+ to A+ and A− to A−). Once the user makes the connections between the motor and control system, the control system will automatically determine the control action required to use the wiring connections made by the user. In other embodiments, additional leads may be connected to the control system. For example, motor 103 may provide Hall-effect phase sensors A, B, and C, that are connected to controller 101. Like the other connections between the motor and the control system, the control system is configured to receive the leads of Hall-effect phase sensors in any order.

Once the user has made the connections between the control system, motor and power supply, the controller 101 then performs a self-commissioning process (block 201). As will be explained in greater detail below, the self-commissioning process identifies the motor type, estimates a motor control model, and computes the closed-loop control design from the estimated model. The self-commissioning process is generally invisible to the user and requires little user input or expertise.

After the control system has completed the self-commissioning process, the control system is ready to accept motion function commands from the user. The motor function specified in a motor function command may differ depending on the motor and the application. For example, a motor function may be a command to move from point-to-point, a command to move at a specified velocity, or a command to move from point-to-point at a specified velocity. When the control system receives a motion function command, the control system plans a motion profile (block 202). As will be explained in more detail below, the motion profile planned by the control system may differ depending on the application and input from the user.

After planning the motion profile, the control system performs the requested motor function according to the planned profile (block 203). After each motor function performed by the control system, the control system uses feedback received from the motor to update the motor model and closed-loop control design (block 204). In other embodiments, the control system may update the motor model less frequently (e.g., every 100 motion commands) or when requested by a user.

Self Commissioning Process

Figure 3:
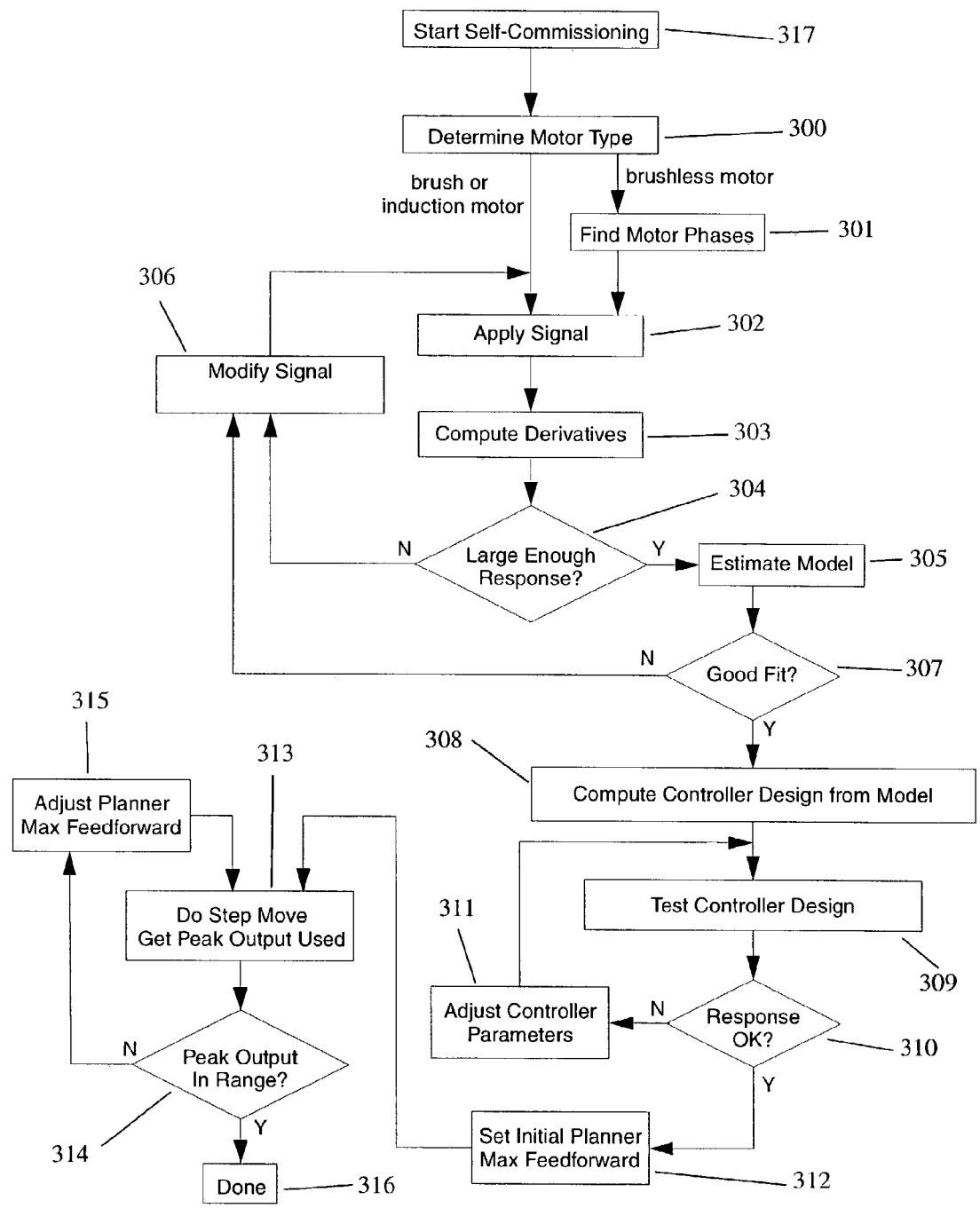
FIG. 3 is a flow chart illustrating the self-commissioning process of the motor control system shown in FIG. 1.

As shown in FIG. 3, the self-commissioning process of control system 100 is further illustrated. The self-commissioning process is initiated as the result of an explicit user command (block 317). In another embodiment, the self-commissioning process may be performed automatically by the control system upon the first motion function command input by a user.

After the self-commissioning process has been initiated, the control system identifies the type of motor by receiving input from the user specifying the motor type (e.g., brush DC, brushless DC, brushless AC, AC induction) (block 300). In another embodiment, a control system may be specifically configured for one type of motor, which would eliminate a motor identification step.

If the motor is identified as a brushless motor (AC or DC), then the control system determines the parameters used in phase commutation (block 301), which allows continuous motor rotation to be achieved for brushless motors. If the motor is not identified as a brushless-type motor, then this step is skipped.

Determining the commutation parameters is referred to as "phase-finding," and may be accomplished using any of the techniques known in the art. For example, one technique that may be used in phase-finding involves applying a small voltage signal, e.g. a 100-millisecond sinusoid at 30% output fraction, to each phase combination (AB, BC, CA) in turn, recording the response, and fitting the commutation parameters in a best-fit sense to all three recordings together. This technique may be particularly advantageous because it may be extended to automatically determine the motor type, without any input from the user, using the following logic:

1. If there is a response (current and/or velocity) on only one phase combination, e.g. AB, BC, or CA, then the motor is a two-phase motor.
   1.1. If a sinusoid voltage signal applied to the motor results in continuous rotation, then the motor is an induction motor.
   1.2. Otherwise, the motor is a DC brush motor.
2. If there is not a response on only one phase, then the motor is a three-phase motor. If Hall-effect inputs are not all zero and not all one, the motor is a DC brushless motor. The Hall-effect sensors may also be used to determine the positions at which the phase changes, by recording the position at which one of the sensor states changes.
3. After finding the phases, a sinusoid may be applied to a single phase combination. If back-and-forth motion is observed, the motor is a DC motor; if no rotation or rotation in a single direction is observed, the motor is an induction motor.
4. If the motor is not an induction motor, the position/velocity/acceleration response to a sinusoid on a single motor phase is observed and a commutation function is fit to the response. If the function best fits a trapezoid, the motor is a brushless DC; if the function best fits a sinusoid, the motor is a brushless AC.

Referring again to FIG. 3, after the control system has identified the motor type (block 300) and, if appropriate, found the motor phases (block 301), the control system then applies an open-loop motor control signal to the motor (block 302). This signal is produced by disabling the closed-loop control (block 111 shown in FIG. 1) so it has zero output, and using the trajectory generator (block 113 shown in FIG. 1) to produce a time-varying waveform as the controller's modulation signal (signal 120 shown in FIG. 1). If the modulator (block 104 shown in FIG. 1) is configured as a voltage controller, the motor control signal (signal(s) 106 shown in FIG. 1) will be a time-varying voltage signal, and if the modulator is configured as a current controller the motor control signal will be a time-varying current signal.

The control system records the magnitude of the motor control signal (either voltage or current) applied to the motor over time. For purposes of illustration, the following discussion assumes that the power supply is a regulated power supply, and therefore the motor control signal (signal 106 in FIG. 1) is directly proportional to the modulation signal (signal 120 in FIG. 1). However, it should be understood that the motor control system described herein is not limited to operation with a regulated power supply. When the motor control signal is directly proportional to the modulation signal, the motor control signal is controlled by setting the corresponding value for the modulation signal, and the motor control signal is recorded by recording the modulation signal.

Additionally, the control system receives and records the position feedback information (signal 122 shown in FIG. 1) generated by the motor in response to the signal applied to the motor, and also records current feedback (signal 121 shown in FIG. 1). As will be described in more detail below, the control system uses the record of position feedback received from the motor to compute derivatives of position (e.g., velocity, acceleration, jerk) for the motor, in block 303.

To avoid damaging the motor, a succession of signals is successively applied, beginning with signals of low amplitude (e.g. 10% of maximum output) and period (e.g. 10 milliseconds) and increasing as needed until significant position, velocity, and acceleration have been observed and used for model fitting.

After the control system has computed derivatives of position, the control system will check to see if it has received a large enough response from the motor (block 304). For example, the control system may check to see if the recorded maximum velocity and/or acceleration is greater than a certain predetermined threshold. If not, then the control system will apply another signal to the motor which is larger in terms of magnitude and/or longer in terms of the amount of time the signal is applied to the motor, and/or has a different form (e.g. triangular waveform, wavelet pulse). Again, the control system will record the signal applied to the motor over a period of time as well as the feedback received back from the motor in response to the signal, and, from this information, will compute derivatives of position.

Once the control system determines that it has received a large enough response (block 304), then the control system proceeds to estimate the motor model (block 305) by estimating the value of the coefficients for the motor model equation(s). As will be explained in greater detail below, the control system uses the data from the control signal applied to the motor, computed derivatives of position, and, optionally, recorded current feedback, to estimate the coefficients for the motor model.

After the control system has estimated the motor model, the control system checks to see if there is a good fit between the recorded data and that which is estimated from the motor model (block 307). If not, then the control system will apply another signal to the motor which is larger in terms of magnitude and/or longer in terms of duration and/or having a different form (block 306), and the control system will repeat the steps described in blocks 302, 303, 304, 305, and 307.

Once the control system determines that the estimated motor model is a good fit with respect to the recorded data, then the control system computes the closed-loop control design from the estimated motor model (block 308), as will be described in more detail below.

After the closed-loop control design is computed, the control system tests the design by Applying a step, impulse, or other suitable stimulus (block 309) as input (e.g., signal 117 shown in FIG. 1) to the closed-loop control. The control system records the position feedback in response to the step input and determines whether the motor has responded within an acceptable error range to the step input (block 310). If the motor has not responded as desired (for example, the response contained too many oscillations), then the control system adjusts (block 311) the closed-loop control design parameters such as frequency and angle, computes revised closed-loop control parameters, and applies another step input.

Once the motor responds to the step input within an acceptable error range, the control system determines the maximum feedforward signal, which is the largest (peak) value of the feedforward signal that will result from a trajectory planned by the trajectory planner (block 110 shown in FIG. 1). The control system uses a conservative initial value (block 312), e.g. 40% of the maximum motor control signal, and using that as well as the motor model, plans and executes a step motion with the closed loop control enabled (block 313). The control system then examines the recorded motor control signal (signal 106 shown in FIG. 1), which includes both the feedforward (signal 119 shown in FIG. 1) and correction (signal 118 shown in FIG. 1) signals. The maximum of the motor control signal is computed and compared with a threshold range (block 314); if the maximum falls outside the threshold range (for example, below 85% or above 95%), then an adjusted value of the maximum feedforward signal is computed (block 315), and blocks 313 and 314 are repeated until the desired maximum motor control signal is achieved. In this way, a portion of the total motor control signal is reserved for the contribution of the closed loop control. When the maximum motor control signal falls within the thresholds, the self-commissioning process is completed and the controller is ready to receive and execute motor function commands (block 316).

Motion Profile Planning

When control system 100 (shown in FIG. 1) receives a motion function command, the control system uses the estimated motor model generated during the self-commissioning process to compute an efficient motion profile for executing the motion function command. A motion profile is a time-sequence of motor positions and their derivatives that is calculated to realize a commanded motion function. The control system 100 may receive several different types of motion function commands depending upon the motor and application. Table 1 lists some typical motion function commands. It should be understood that sequences of motion function commands may be programmed, along with other industrial functions such as monitoring or setting input/output points, so as to appear to the user as a single commanded function.

TABLE 1

| Motion Function Command | Motion Description |
|---|---|
| Step | Move to a commanded position; initial and final velocities are zero. |
| Scan | Move to a commanded position; initial and final velocities are zero. During the move, accelerate to a specified scanning velocity, and maintain motion at that velocity until it's necessary to decelerate to zero velocity to arrive at the commanded final position. |
| Spin | Accelerate to a commanded velocity, and spin the motor at that velocity indefinitely until a new motion command is issued. |
| Interpolate | Change from the initial position and velocity to a specified final position and velocity, optionally taking a specified time duration to do so. |
| Cam | Track the position and/or velocity of an input source. For example, one or more external position sensors may be read and combined according to a user-defined mathematical formula, and the result serves as the position and/or velocity command that the motor is to track on a continuous basis. |

Figure 4:
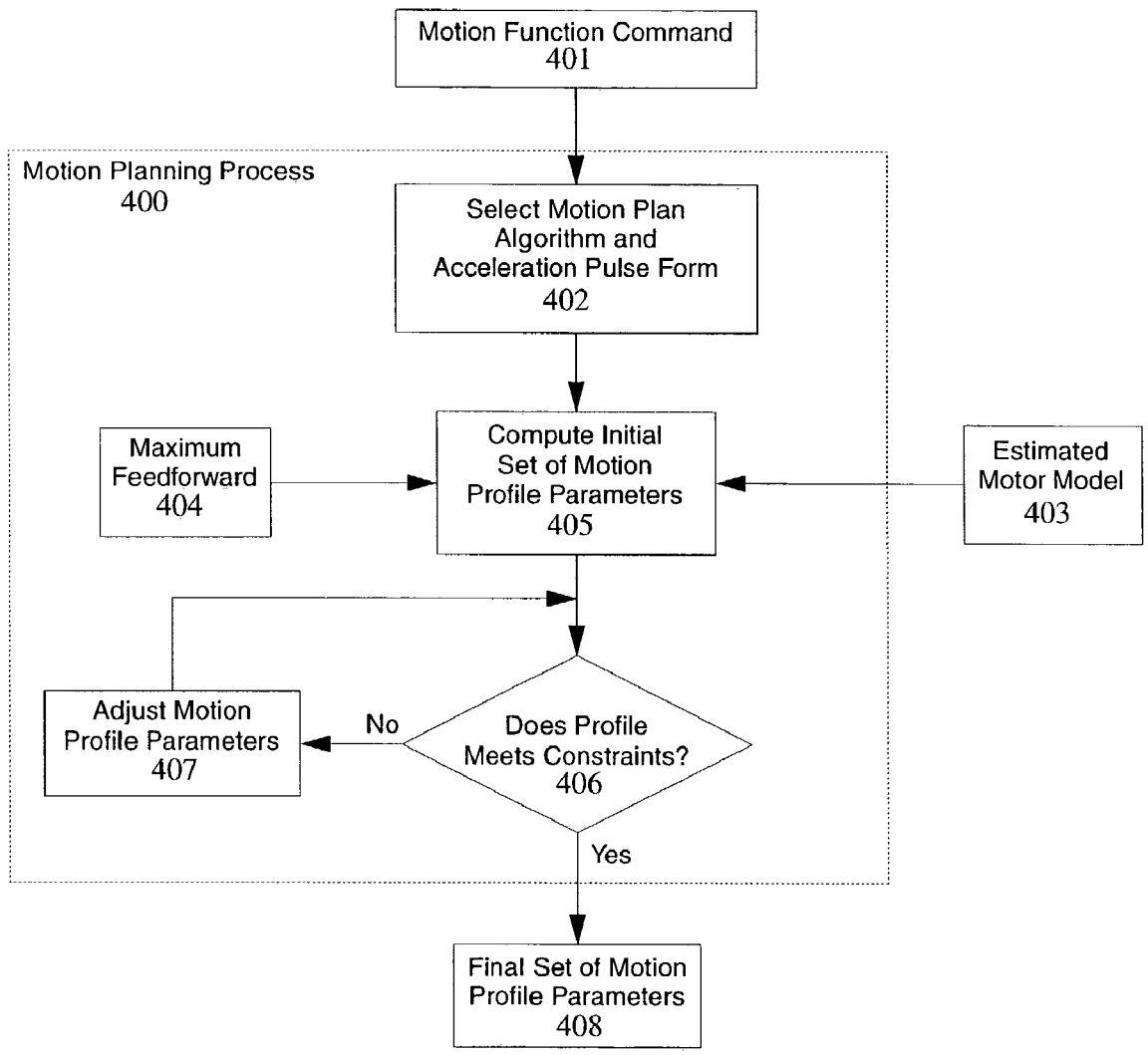
FIG. 4 is a flow chart illustrating the motion planning process shown in FIG. 1.

FIG. 4 illustrates the motion profile planning process 400 performed by the trajectory planner 110.

Generally, the motion profile planning process 400 receives a motion function command 401, selects a motion plan algorithm and acceleration pulse form 402, and iteratively determines a set of motion profile parameters 405-408. As will be explained in more detail below, the motion profile planning process 400 selects the motion plan algorithm and acceleration pulse form based on the motion function command 401 and pre-stored input from the user indicating desired motion performance. The motion profile process 400 then calculates an initial set of motion profile parameters 405 based on the motion function command 401, the selected motion plan algorithm and acceleration pulse form 402, and the estimated motor model 403 and the maximum feedforward signal 404 (previously determined from the self-commissioning process). After the initial set of motion profile parameters are computed, the motion profiling process 400 engages in an iterative process by checking the motion profile against a set of predetermined constraints 406, and adjusting the motion profile parameters 407 until the motion profile satisfies the predetermined constraints. Once the computed motion profile parameters meet the predetermined constraints, the motion profile planning process outputs a set of final motion profile parameters 408. Referring again to FIG. 1, the trajectory generator 113 receives the set of motion profile parameters and uses these parameters, along with the estimated motor model, to realize the commanded motion function.

The motion profile parameters 408 are a set of parameters that specify the state of motor motion (e.g., position and its derivatives) over the time required to realize the commanded motion function. For example, the parameters 408 may be the pulse times and peak acceleration values for a sequence of acceleration pulses of a specified form (e.g. quadratic, harmonic, trapezoidal). In another embodiment, the parameters are a set of peak jerk, acceleration, and velocity values.

The control system selects a motion plan algorithm and acceleration pulse form to produce satisfactory motion performance based on the type of motion function command and pre-stored input from the user 402. For example, the plan algorithm and acceleration pulse form may be selected to perform the motion function command with low power dissipation, or may be selected to perform the motion function command in the shortest amount of time regardless of power dissipation. In a preferred embodiment, these selections are based on input received from a user indicating a desired motion performance. Generally, this input will be stored in memory and will apply to subsequent motion function commands until the user changes the motion performance settings.

In another embodiment, the control system may base the plan algorithm and acceleration pulse form based on a usage history of the control system. For example, if the control system has historically experienced long idle times between commands, then the control system may determine that power dissipation is not a significant factor, and a high-speed, high-power plan algorithm and acceleration pulse form such as a pulse-cruise-pulse (PCP) algorithm with quadratic acceleration pulse might be selected for a step motion function. Similarly, if the control system has historically maintained relatively constant motor motion (i.e., little idle time), then a longer-time, lower-power plan algorithm and acceleration pulse form such as a balanced pulse-pulse (BPP) algorithm with harmonic pulse might be selected.

The estimated motor model 403 and the maximum feedforward signal 404, initially determined during the self-commissioning process, are used in the motion profile planning process to compute the motion profile parameters. However, in other embodiments the maximum feedforward signal may be specified by the user. The estimated motor model 403 and the maximum feedforward signal 404 may be updated from time to time upon a user request, at periodic intervals (e.g., every 10 motion commands), or upon a triggering event.

The control system stores the maximum feedforward signal 404 as the fraction of maximum motor control signal. In a preferred embodiment, the motion profile parameters are planned such that the feedforward signal (signal 119 in FIG. 1) does not exceed, but just reaches, the maximum feedforward signal 404. In this sense the planned motion profile is efficient, given all the other specifications and constraints, because the motion profile will be within the motor's capacity (including a portion reserved for the closed-loop control to compensate for external disturbances), but does not significantly under-use the motor's capacity.

Once the control system calculates an initial set of motion profile parameters 402, the planned motion is evaluated using these parameters and the motor model (expressed in formulas such as 708 shown in FIG. 7) to obtain the peak magnitude of the planned feedforward signal as well as other values such as peak velocity, peak acceleration, and RMS (Root-Mean-Square) acceleration. The control system tests the initial motion plan by comparing the results to one or more predetermined constraints 406. For example, if the planned peak feedforward signal, given a selected set of motion profile parameters, exceeds or is substantially less than the maximum feedforward of the controller 404, then the profile parameters are adjusted and the evaluation repeated. Other predetermined constraints may include maximum velocity, maximum acceleration, maximum current, and maximum RMS acceleration. This iterative process continues until all of the predetermined constraints are met. The logic of this iterative process may be any of several techniques known in the art such as root-finding (e.g. by bisection) and minimization (e.g. by golden-section search).

Figure 5:
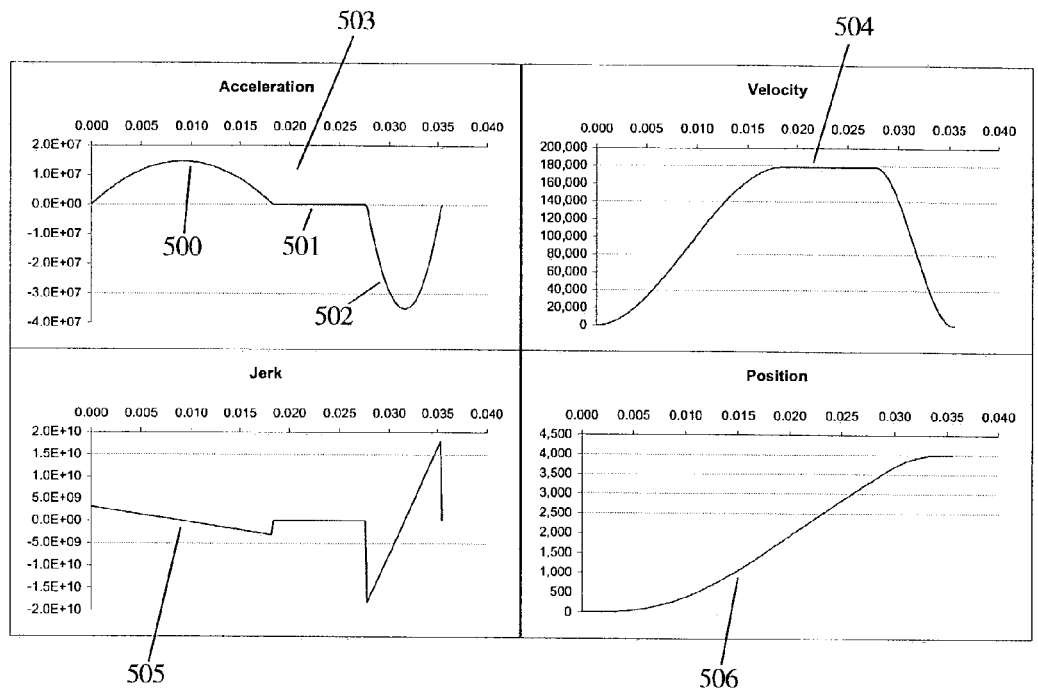
FIG. 5 is a series of graphs depicting acceleration, velocity, jerk and position of a motion function command.

As previously mentioned, the set of motion profiles parameters may be in the form of a set of parameters specifying a sequence of acceleration pulses. For example, as shown in FIG. 5, a step motion function command is realized by constructing an acceleration pulse 500, followed by a constant-velocity (zero-acceleration) phase 501, and ending with a deceleration pulse 502. The time-functions of position 506, velocity 504, and jerk 505 are then directly computed from this sequence of acceleration pulses 503.

Figure 6:
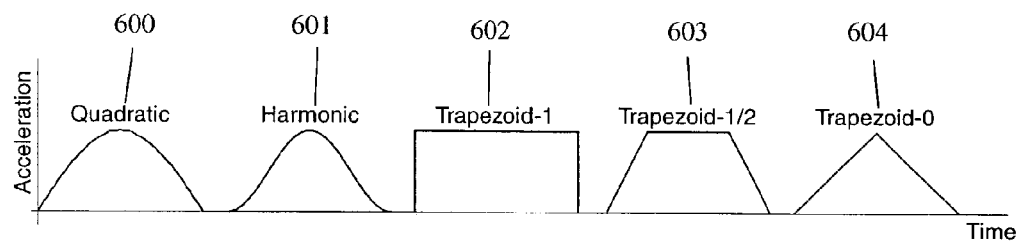
FIG. 6 is a graph illustrating several different types of acceleration pulses that may be used to execute a motion function command.

The control system may use different forms of acceleration pulses to construct a motion profile, and FIG. 6. illustrates five types of acceleration pulses that may be used. However, it should be understood that the control system may use other types of acceleration pulses known in the art, such as cycloidal or piecewise-linear. The acceleration pulses may be mathematically described in terms of acceleration as a function of time by the following equations (note that T denotes the pulse duration and A denotes the peak acceleration value).

1. Quadratic Pulse (600):

$$a(t) = \frac{4At}{T}\left(1 - \frac{t}{T}\right) \quad (1)$$

2. Harmonic (601):

$$a(t) = \frac{A}{2}\left(1 - \cos\frac{2\pi}{T}t\right) \quad (2)$$

3. Trapezoid (602, 603, 604). This describes a family of pulse forms that uses an acceleration fraction F to adjust the total time spent at the peak acceleration. The acceleration fraction F specifies the fraction of the total time spent at the peak acceleration. If F=1, the pulse form is a square wave (602) (often termed "bang-bang" acceleration). If F=0, the form is a triangle (604). If F=½, then half the total duration T is spent at the peak acceleration (603). To compute the acceleration, the times when peak acceleration begins ($t_1$) and ends ($t_2$) must be first computed:

$$t_1 = \frac{T(1-F)}{2} \quad (3)$$

$$t_2 = t_1 + FT$$

Now the acceleration is given by:

$$a(t) = \begin{cases} A\frac{t}{t_1}, & t < t_1 \\ A, & t_1 < t \le t_2 \\ A\left(1 - \frac{t-t_2}{t_1}\right), & t_2 < t \le t_3 \end{cases} \quad (4)$$

As previously discussed, the control system may select different acceleration pulse forms depending on the motion function command and a desired motion performance indicated by a user (or based on the history of motions performed). A trapezoidal or quadratic form may be used to provide faster motion, while a harmonic form may be chosen to provide smoother motion. A pulse of each type is completely specified by its duration T, and peak acceleration, A.

As will be explained in more detail below, the control system utilizes mathematical equations associated with each pulse form as part of the motion plan algorithm and trajectory generator. While the equations associated with acceleration pulse forms are known in the art, FIG. 7 provides the equations for the quadratic and harmonic acceleration pulses.

The equations for computing acceleration 700, velocity 701, position 702, and jerk 703, are used by the trajectory generator (block 113 shown in FIG. 1) to compute the derivatives of position as a function of time. The change in velocity for a single acceleration pulse is given by equation 704, and the distance traveled by an acceleration pulse is given by 705; the distance traveled in a step motion is given by 706, the RMS acceleration is given by 707, and the time at which the peak feedforward signal occurs during an acceleration pulse is given by 708. One or more of equations 700-708 are used by the trajectory planner to produce a set of motion profile parameters specifying a sequence of acceleration pulses.

To illustrate the operation of the motion profile planning process, suppose a spin motion function command is received by the control system. In a spin motion function command, the final velocity is included in the spin motion function command. Based on the type of motion function (i.e., spin) and pre-stored motion preferences (e.g. perform fast acceleration), the motion planning process 400 selects a quadratic acceleration pulse and a spin plan algorithm. The motion profile planning process 400 executes the spin plan algorithm by selecting an initial acceleration pulse duration T for a single quadratic acceleration pulse to provide the required change in velocity. The motion profile planning process then engages in a bisection search algorithm along the time dimension, which will be familiar to those skilled in the art, to iteratively compute the final set of profile parameters (i.e., A and T values). For each trial acceleration pulse time, T, the motion profile planning process executes the spin plan algorithm in the following manner:

1. Using the selected pulse duration value T, the peak acceleration A required to satisfy the initial and final velocities is computed using equation 704.
2. Next the peak planned feedforward signal (expressed as a fraction) is computed by calculating the maximum pulse output time, t, using equation 708, and the result is used in equations 701, 700, and 703 to compute derivatives of position (i.e., velocity, acceleration and jerk). Next, the results are used in the estimated motor model equation to compute the peak planned feedforward signal.

3. The peak planned feedforward signal is then compared to the maximum feedforward signal of the controller. If the peak planned feedforward signal does not exceed and is sufficiently close to the maximum feedforward signal of the controller (e.g., within a half percent), then the current values of A and T are used to form the final set of motion profile parameters. If not, then a new duration T is selected, and steps 1-3 are repeated.

Figure 8:
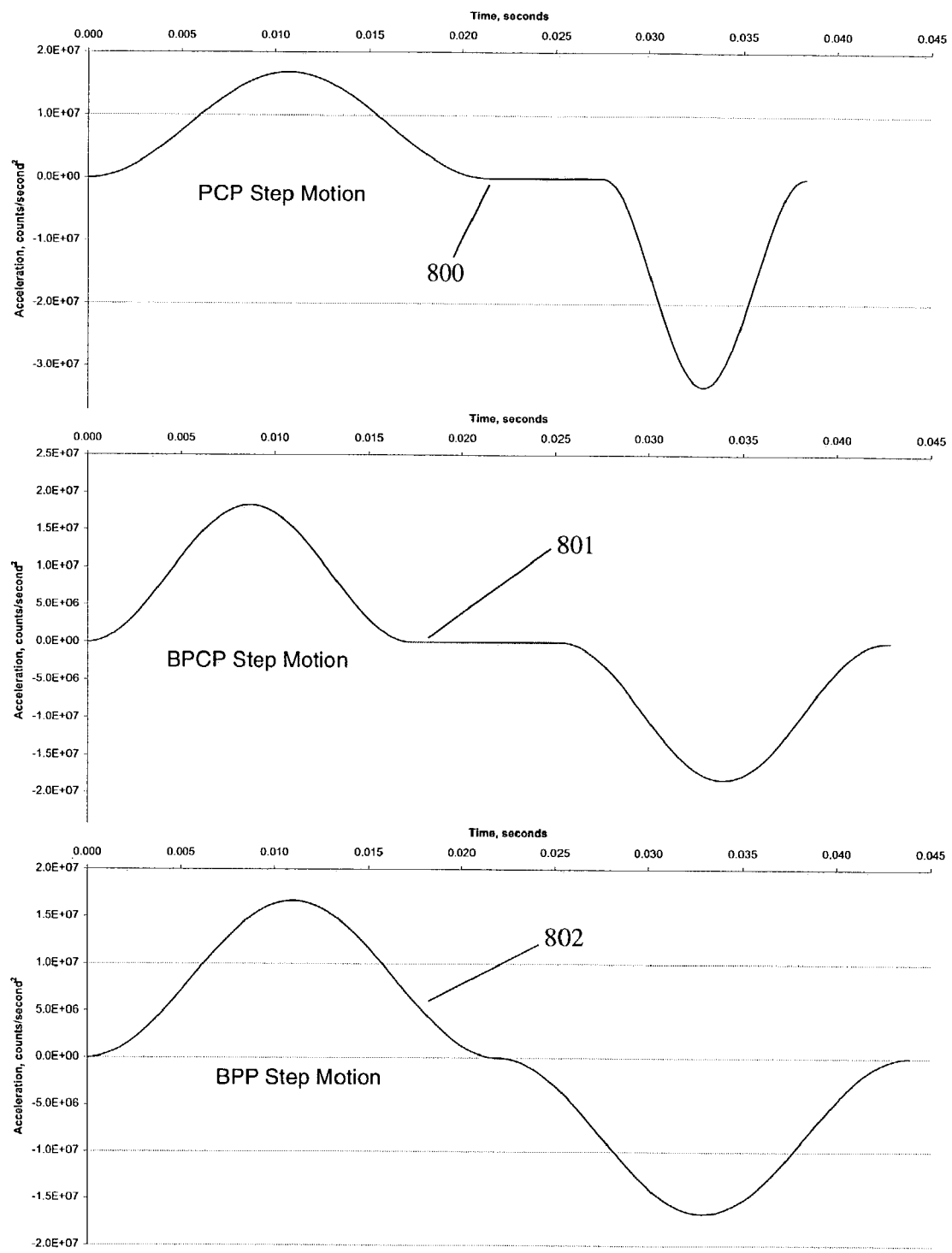
FIG. 8 is a series of graphs illustrating three different motion planning algorithms.

To illustrate the operation of the motion profile planning process in response to a step motion function, suppose a step motion function command is received by the controller that specifies a distance to be moved (typically specified in terms of counts). Based on the type of motion function (i.e., step) and pre-stored motion preferences, the motion planning process 400 selects an acceleration pulse form and one of the following motion plan algorithms shown in FIG. 8:

1. A pulse-cruise-pulse (PCP) algorithm is illustrated in graph 800 where three segments, acceleration, cruise (constant-velocity), and deceleration, are used to realize a step motion function. Note that the acceleration and deceleration peak values and durations are allowed to be different with a pulse-cruise-pulse plan algorithm (although they need not be different). The pulse-cruise-pulse plan provides the fastest motion of the three algorithms, at a cost of increased power dissipation.

2. A balanced pulse-cruise-pulse (BPCP) algorithm is illustrated in graph 801. Note that the BPCP is the same as the PCP algorithm, except the deceleration pulse is constrained to have the same duration (and hence, amplitude) as the acceleration pulse. This algorithm provides reasonably fast motion, but with less power dissipation than the PCP algorithm.

3. A balanced pulse-pulse (BPP) is illustrated in graph 802. Note that the BPP algorithm is the same as the BPCP except that no constant-velocity phase is allowed. This algorithm provides the lowest power dissipation, but provides the slowest motion.

If the PCP algorithm is selected, the motion profile planning process executes the PCP algorithm by a golden-section minimization search along the peak-velocity dimension as follows:

1. Select an initial peak velocity.
2. Using the spin plan algorithm described above, compute the parameters for acceleration from zero to the peak velocity (i.e. $A_a$, $T_a$), and deceleration from peak velocity to zero (i.e. $A_d$, $T_d$).
3. Compute the distance traveled by both these pulses using equation 705; if the total is greater than the step distance, the selected peak velocity is not feasible, a new peak velocity is selected, and steps 2-3 are performed again.
4. If the total distance traveled by the pulses computed in step 3 is less than or equal to the step distance, then compute the constant-velocity time (i.e. $T_c$) and the total motion time (i.e. $T_a+T_c+T_d$).
5. Steps 1-4 are repeated until the peak velocity that produces the smallest total duration is found. Once this peak velocity is found, the corresponding acceleration pulse parameters $A_a$, $T_a$, cruise time $T_c$, and deceleration pulse parameters $A_d$, $T_d$ form the final set motion profile parameters that are fed to the trajectory generator.

If the BPCP algorithm is selected, then the motion profile planning process performs the same steps as the PCP algorithm described above except that a different step 2 is used:

2. Using the spin plan algorithm, compute the parameters for acceleration from zero to the peak velocity (i.e., $A_a$, $T_a$) and deceleration from peak velocity to zero (i.e., $A_d$, $T_d$). Use the longer of the two durations for both phases.

The resulting final set of motion parameters for the BPCP algorithm thus has three parameters T, A, and $T_c$, since $T_a=T_d=T$, and $A_a=A$, and $A_d=-A$.

If the BPP algorithm is selected, the motion profile planning process executes the BPP algorithm by a bisection search along the pulse-time dimension as follows:

1. Select a pulse time, T.
2. Compute the peak acceleration, A, required to step the specified distance using equation 706.
3. Compute the resulting peak velocity using equation 704.
4. Compute the peak planned feedforward signal (expressed as a fraction) by calculating the maximum pulse output time, t, using equation 708, use the result in equations 701, 700, and 703 to compute derivatives of position (i.e., velocity, acceleration and jerk), and then use the results in the estimated motor model equation to compute the peak planned feedforward signal.
5. Compare the peak planned feedforward signal to the maximum feedforward signal of the controller. If the peak planned feedforward signal does not exceed and is sufficiently close to the maximum feedforward signal of the controller (e.g., within a half percent), then the current values of A and T are used to form the final set of motion profile parameters (since $A_a=A$ and $A_d=-A$). If not, then a new pulse time, T, is selected, and steps 1-3 are repeated.

Figure 9:
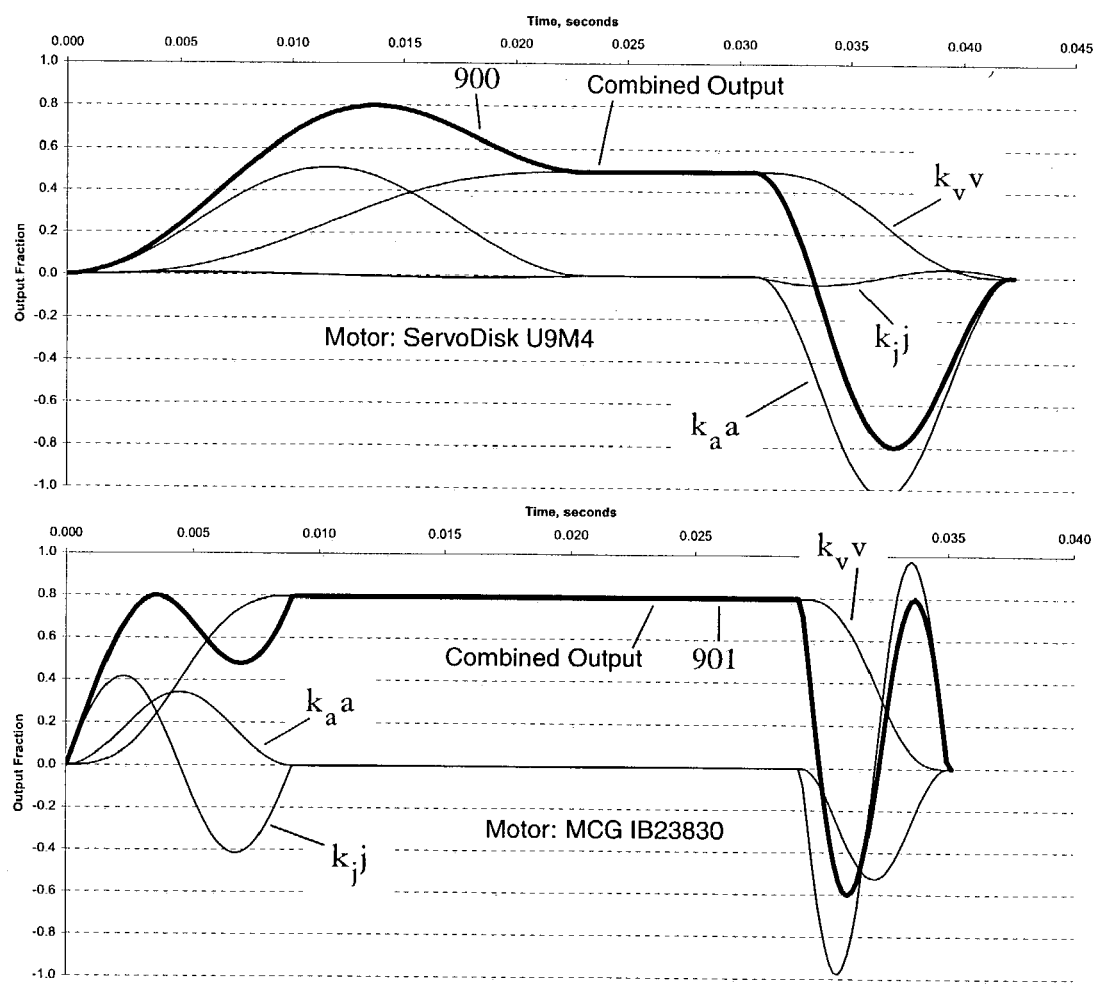
FIG. 9 are two graphs plotting controller output against time for two separate motors for the same motion function command.

Note that the estimated motor model produced during the self-commissioning process is an important element to compute an efficient motion profile, since different motors will typically require a different modulation waveform to realize the same motion. For example, as shown in FIG. 9, a feedforward signal (e.g., signal 119 in FIG. 1) for two different DC motors, a Kollmorgen ServoDisc™ U9M4 motor (trace 900) and a MCG™ IB23830 (trace 901), is shown. Each feedforward signal 900, 901 is generated from a set of parameters generated by the motion profile planning process in response to a motion function command specifying a step of one motor revolution and using a PCP algorithm with quadratic acceleration pulses. While the motion function command, motion plan algorithm, and acceleration pulse form are all the same, the feedforward signal is obviously very different for the two motors. However, the feedforward signal reaches the specified maximum feedforward fraction (in this case the maximum feedforward fraction was specified at 80%), for both acceleration and deceleration, for each motor.

The following description provides for more specific implementations of the motor control system described above.

DC Brush Motor Embodiment

Figure 10:
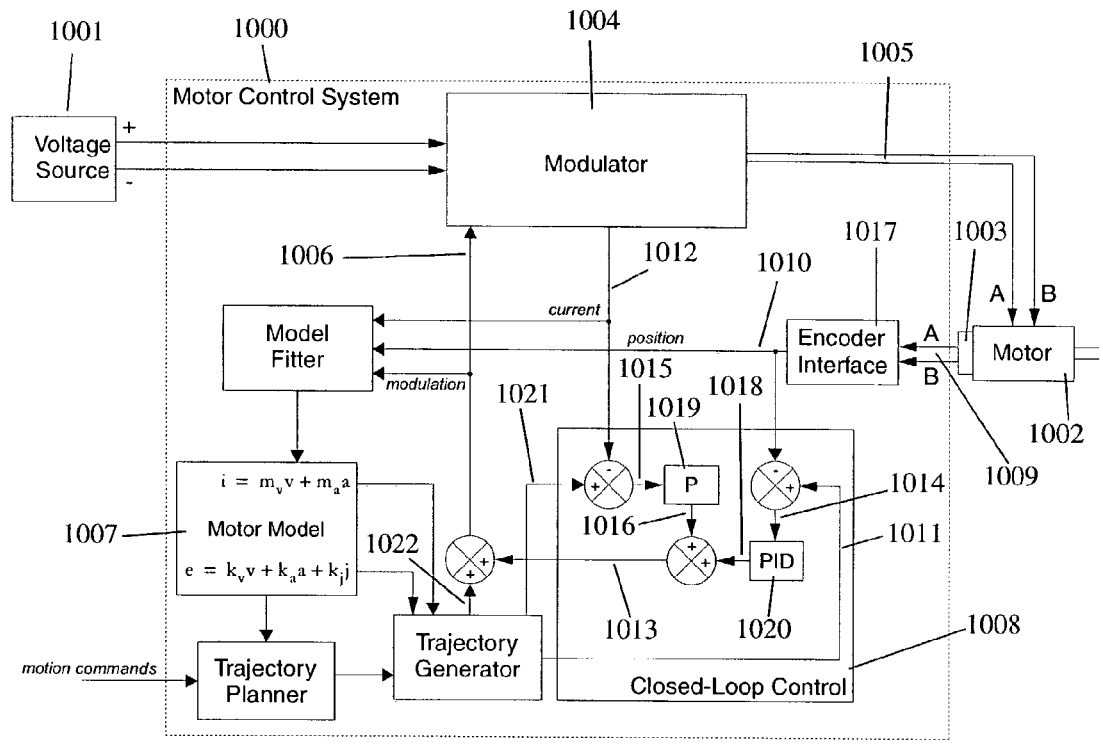
FIG. 10 is a block diagram illustrating another motion control system.

As shown in FIG. 10, a motor control system 1000 is connected to a constant voltage source 1001 and a DC brush motor 1002. The DC brush motor includes an optical encoder position feed-back unit 1003 to provide position information to the control system. The control system 1000 includes an encoder interface unit 1017 that receives and processes signals 1009 received from the optical encoder position feed-back unit 1003.

The control system includes an H-bridge modulator 1004 that controls the voltage on the motor in response to a modulation signal 1006, using pulse-width-modulation (PWM). Since motor control system 1000 is configured for use with a DC brush motor, a commutator (element 123 shown in FIG. 1) is not functionally present (note that the commutator may be physically present but is bypassed when the motor type is a non-brushless motor).

The motor model 1007 of the control system 1000 uses equations that describe a DC brush motor. The closed-loop control 1008 is a state-space controller having four state variables, three of which are configured to provide the Proportional-Integral-Derivative (PID) control of position that is familiar to those skilled in the art. The fourth state variable is used for proportional current control. A state variable is a member of a set of variables (known as "state variables") whose values collectively completely determine the dynamic state of a system.

The following equations mathematically describe the operation of an idealized brush DC motor:

$$e = L\frac{di}{dt} + Ri + k_\tau v \qquad (5)$$

$$\tau = k_\tau i \qquad (6)$$

$$ik_\tau = I\frac{dv}{dt} + bv + f \cdot sgnv + \tau_b \qquad (7)$$

In the above equations, L and R are inductance and resistance of the motor windings, respectively, $k_\tau$ is the motor torque (force) constant, e is voltage, i is current, and v is motor velocity. The mechanical quantities I and b are inertia and damping, respectively, f and $\tau_b$, are friction and bias forces respectively. The mechanical quantities describe the properties of the combined system of the motor, transmission, and its connected load. The term sgnv equals 1 if v>$V_f$, where $V_f$ is a specified small threshold velocity, equals −1 if v<−$V_f$, and equals zero otherwise.

Equations (5), (6), and (7) can be combined to produce the following equation:

$$e = \left(\frac{Rb}{k_\tau} + k_\tau\right)v + \left(\frac{Lb + IR}{k_\tau}\right)a + \frac{IL}{k_\tau}j + \frac{Rf}{k_\tau}sgnv + \frac{R}{k_\tau}\tau_b \qquad (8)$$

where v is velocity (the first derivative of position) and equals $$\frac{dp}{dt},$$

a is acceleration (the second derivative of position) and equals $$\frac{d^2 p}{dt},$$

and j is jerk (the third derivative of position) and equals $$\frac{d^3 p}{dt}.$$

This control system, then, uses a model equation expressed in the following form:

$$e = k_v v + k_a a + k_j j + k_f sgnv + k_0 \qquad (9)$$

The motor voltage e corresponds to the motor control signal 1005, and equation (9) is used to predict the motor voltage required at a particular time. Therefore equation (9) is used to provide the feedforward voltage signal 1022, which is combined with the closed-loop control correction signal 1013, to produce the modulation signal 1006. The constants $k_v$, $k_a$, $k_j$, $k_f$, and $k_0$ are coefficients that correspond to the terms in equation (8). As will be described in greater detail below, one of the functions of the self-commissioning process is to determine the coefficients $k_v$, $k_a$, $k_j$, $k_f$, and $k_0$ for the particular motor connected to the control system.

The following second model equation, a symbolic rearrangement of equation (7), is used to provide the reference value 1021 for current control 1019:

$$i = m_v v + m_a a + m_f sgnv + m_0 \qquad (10)$$

The constants $m_v$, $m_a$, $m_f$, and $m_0$ are coefficients that correspond to the terms in equation (7). These coefficients are also determined as part of the self-commissioning process.

The control system 1000 is configured such that the units of the model equations (9) and (10) are kept in a form such that the control system does not require physical motor knowledge. For example, the motor voltage e has units of "fraction of maximum output" (as opposed to volts) and has an allowable range of −1≦e≦1; where the value +1 corresponds to "maximum positive" and the value −1 corresponds to "maximum negative" output. This corresponds naturally to the controller operation, where the actual output may be a PWM duty cycle or a DAC (Digital-to-Analog Converter) command in a scaled range, e.g. $-2^{12} < e < 2^{12}$.

The motor position has units of "counts" where each count is the smallest integral representation of a unit of motor movement. Position counts are directly provided to the controller by optical encoders 1003. Defining motor position in terms of "counts" permits the control system to easily interpret feedback from other position feedback devices such as the LSB (Least-Significant-Bit) of the ADC (Analog-to-Digital Converter) reading of a resolver. The units of the coefficients, then, are in terms of the above quantities. For example, $k_v$ has units of output-fraction per counts-per-second, similarly $k_a$ has units of output-fraction per counts-per-second-squared. This form is universally useful, and applies equally well to rotational or linear motors. Thus, the control system does not require knowledge of any of the electrical or mechanical parameters in equation (8).

Once the motor model coefficients (i.e., $k_v$, $k_a$, $k_j$, $k_f$, and $k_0$) are calculated, several other motor parameters can be directly derived from these coefficients. For example, the mechanical time constant is closely approximated by $k_a/k_v$, and the electrical time constant by $k_j/k_a$. The maximum motor velocity can be approximated by:

$$v_{max} = \frac{1 - |k_f| - |k_0|}{|k_v|} \qquad (11)$$

As previously explained in FIG. 3 and its corresponding discussion, the motor model coefficients are calculated during the self-commissioning process. The following provides a more detailed illustration of the general procedure outlined in FIG. 3.

Referring again to FIG. 10, a voltage signal consisting of a time-sequence of varying voltage levels is applied to the motor. For example, this control system may apply 1.5 cycles of a sinusoid having 200 millisecond period and peak amplitude (output fraction) of 80%. The modulation signal (signal 1006), motor position feedback (signal 1010), and current feedback (signal 1012), are recorded during each servo processing interval, which is every 178 microseconds in this example.

Figure 11:
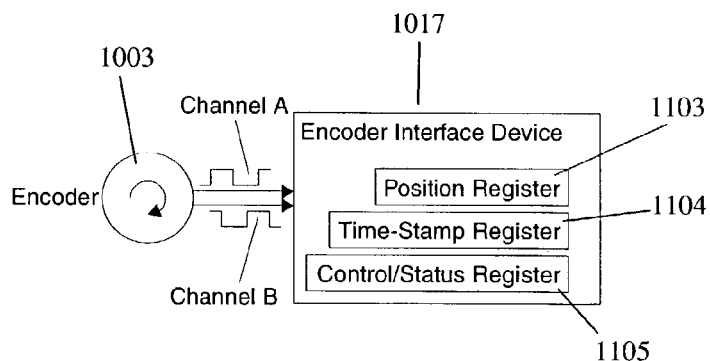
FIG. 11 is a block diagram further illustrating the encoder interface device of the motion control system depicted in FIG. 10.

The encoder interface unit 1017 records position data with high accuracy and its operation is. further illustrated in FIG. 11. As shown in FIG. 11, the encoder 1003 provides two digital input lines, channels A and B, to the encoder interface unit 1017. The signals produced by the encoder 1003 and propagated along channels A and B are two square waves in quadrature (i.e. 90° out of phase). An up or down transition on either input signifies that the position has been increased or decreased by one "count". Each time the encoder interface unit 1017 senses a transition, the encoder interface unit records the count in position register 1103. The encoder interface unit also records the time ("time stamp") that the most recent encoder count event (input transition) took place. The time is kept with a very high resolution timer, for example, a 25 MHz timer can be used to record the encoder event to a resolution of 40 nanoseconds. At each servo processing interval (i.e., every 178 microseconds), a time/position datum pair is fed to the control system 1000 from the position and time registers 1103, 1104. Processing of the time/position pair may be further enhanced by means of a control/status register 1105 that indicates if a new encoder event occurred since the last servo processing time.

The encoder interface unit in this controller provides the time stamp for the most recent encoder event. The encoder event timer is free running, i.e. it is never reset as is done when measuring the interval between two encoder events. By supplying the time of the most recent transition, and by ensuring the servo processing interval is shorter than the encoder timer overflow time, the control system can determine the precise time interval between all elements in a very large set of encoder events. The control system is then able to use sequences of time/position data to compute high-accuracy derivatives of position. One such method is to use a sequence of two measurements, $P_1$, $t_1$ and $P_2$, $t_2$ to compute an estimate of velocity:

$$\text{velocity} = \frac{p_2 - p_1}{t_2 - t_1} \tag{12}$$

This method provides high accuracy at high and low velocities and at times when the interval between reading the position and time registers is not constant, and does not require multiple modes of logic for different velocity ranges.

In this embodiment, the encoder interface unit 1017 is implemented by programming an FPGA (Field-Programmable Gate Array). The encoder interface maintains a high-frequency timer, e.g. 25 million timer "ticks" per second (40 nanoseconds duration between ticks). The state of input channels A and B is monitored at each timer tick. If a change is detected, the time of the state change is recorded immediately, by copying the value of the high-frequency timer into an intermediate time register. If the state of the inputs remains unchanged for a given further number of timer ticks (thus performing a noise-rejection function), then the position register is either incremented or decremented, according to the state of channels A and B, and the intermediate time register is copied to the "time-stamp" register.

The encoder interface unit 1017 provides a regular servo-processing interrupt to the controller. At each interrupt, the control system reads the position and time-stamp registers, and saves these values in a ring buffer for later use by other software that estimates second and third order derivatives (acceleration, jerk) for use in motor modeling.

The encoder interface unit 1017 includes a control/status register 1105 that indicates if the position register has changed since the previous servo processing interval. Because the encoder interface unit 1017 provides the control system regular interrupt, the time between interrupts is precisely known as a fixed number of timer ticks. Thus the control system can compute the time interval for intervals between position events that exceed the wrap-around time of the encoder time register, for example, when 1000 consecutive servo intervals occur with no encoder event (i.e. at lower velocities).

The encoder interface unit 1017 provides the means for the control system to precisely synchronize the timing information between the position feedback, servo processing, and PWM generation, in the following ways:

1. The encoder interface unit provides a register (not shown) that the control system may read to determine the current value of the free-running high-frequency timer.
2. The encoder interface unit provides a register (not shown) that the control system may read to determine the timer value at the time the interrupt was asserted.
3. The encoder interface unit generates the PWM waveform. The PWM waveform is synchronized with the processor interrupt delivered to the control system; a new PWM wave-form cycle begins just after an interrupt is asserted. The encoder interface unit provides a register (not shown) that the control system writes to in order to command the duty cycle of the PWM waveform.

Thus, the control system is able to compute the time offset between position events and the time the motor control signal is changed. It can use this information to reduce time-delay effects and improve the quality of closed-loop control.

Figure 12:
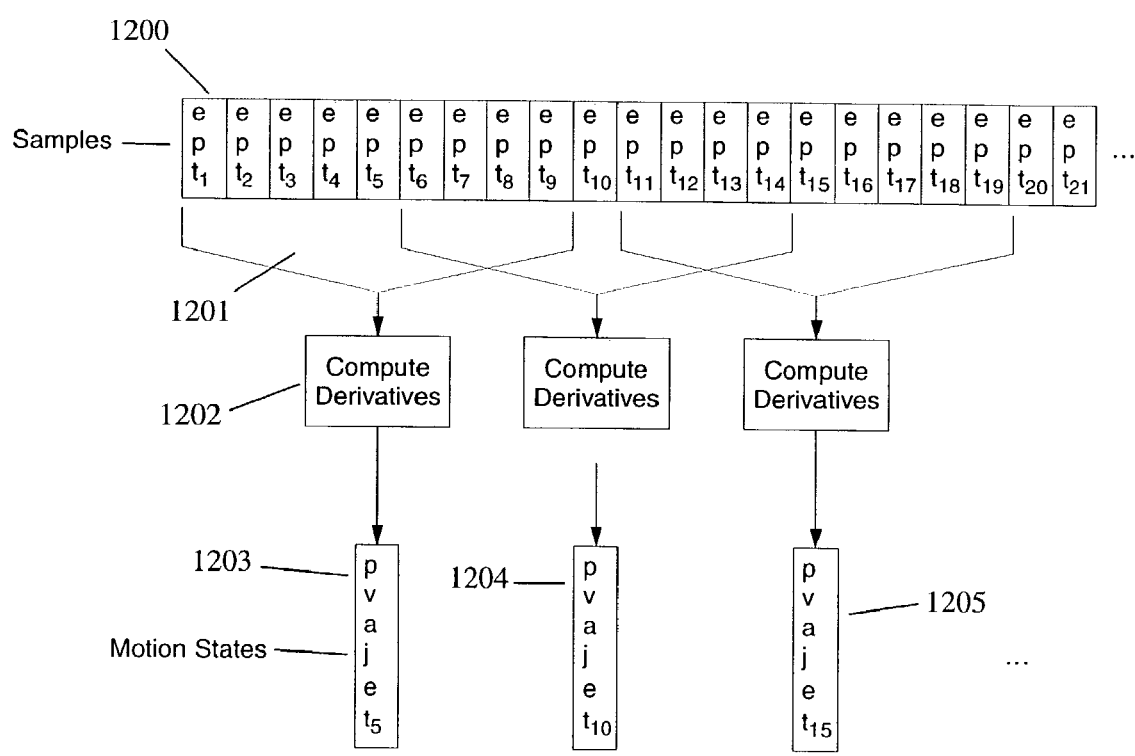
FIG. 12 is a diagram illustrating computation of derivatives of position and motion states from a series of modulation signal, position, and time stamp recordings.

Even though the servo rate is uniform, the sequence of time/position pairs will typically not be uniformly spaced in time. However, the time at which the position was achieved is recorded with a high accuracy. After recording a series of motor positions and times, the recorded position/time pairs are used to compute a series of positions plus first, second, and third derivatives of position at selected sample times. The result of this computation is called a "motion state." FIG. 12 illustrates how the motion states are computed. For each motion state 1203-1205 to be produced, a set 1201 of recorded samples 1200 (time, position, modulation signal) is selected. In one method, four pairs are selected that span the desired sample. For example, pairs at approximate times (relative to the final sample time) of −1, 0, +1, and +2 milliseconds are selected. These four time/position pairs are then fitted to a polynomial, representing position as a function of time:

$$p = k_0 + k_1 t + k_2 t^2 + k_3 t^3 \tag{13}$$

The polynomial fit is performed using any mathematical method known in the art, such as Rybicki's method, to determine the coefficients $k_i$. Once the coefficients are calculated, the derivatives of position, p, can then be simply computed according to the following formulae:

$$v = k_1 + 2k_2 t + 3k_3 t^2$$

$$a = 2k_2 + 6t k_3$$

$$j = 6k_3 \tag{14}$$

Figure 13:
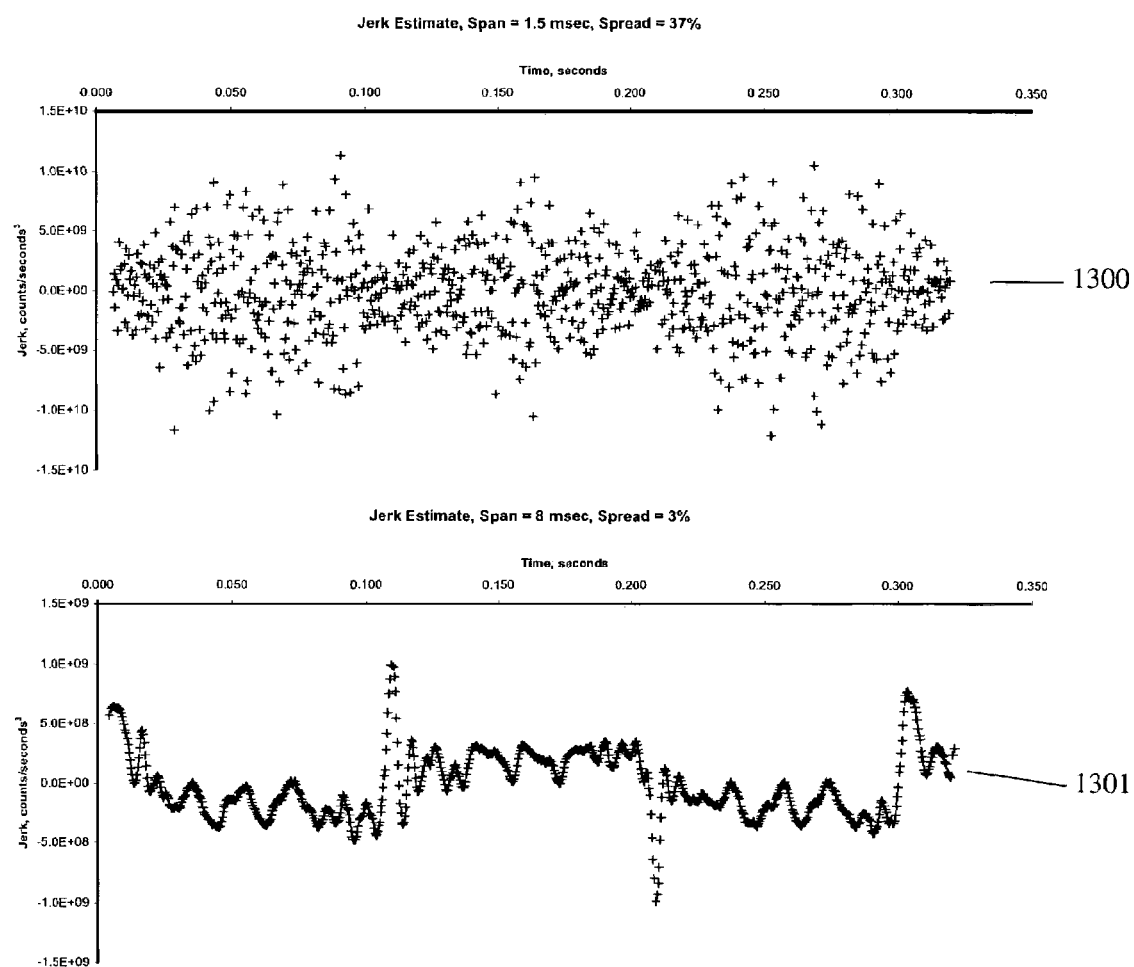
FIG. 13 are two graphs illustrating jerk estimates using 1.5 millisecond and 8.0 millisecond sample spans.

The control system determines the sample span (e.g., $t_1$-$t_9$ is the sample span for motion state 1203) to optimize jerk estimation since jerk is the most difficult derivative to estimate. Encoder error, either in time or position, can substantially increase the error in the jerk estimate. Because the motor being controlled is unknown, the error characteristics of the encoder are therefore also unknown. Therefore, the control system employs a technique to select a sample span in order to increase the accuracy of the jerk estimate. In this technique, the control system gradually expands the sample span used to produce each motion state until the "spread" (a measure of noise) associated with a series of jerk estimates falls below a certain threshold (e.g., 5%). Using a longer span tends to smooth noise from the jerk estimate, but, if the span is too long, then changes in jerk may be excessively smoothed which would also decrease the accuracy of the jerk estimate. Using a shorter sample span, however, the jerk signal may become lost in noise overlaid on the underlying jerk signal, making an accurate estimate of jerk more difficult. To illustrate this problem, FIG. 13 shows the jerk estimates using the same servo record processed with two different sample spans to produce a set of motion states. In graph 1300 the span is 1.5 milliseconds and the jerk signal is largely lost in the noise, while in graph 1301 the span is 8 milliseconds and produces a better jerk estimate. However, if the span was expanded beyond 8 milliseconds, the jerk signal would become more smoothed and may decrease the accuracy of the jerk estimate.

The control system measures the spread of a jerk estimate given a selected sample span by computing the ratio of mean absolute difference between samples and dividing by the largest absolute value:

$$E_j = \frac{|j_i - j_{i-1}|}{\max(|j_i|)} \tag{15}$$

The control system selects the sample span according to the following algorithm. First, the control system computes jerk estimates for a relatively short window of motion states spaced at the servo interval (178 microseconds). The control system starts with a small span, e.g., 2 milliseconds, and then computes the spread. The control system then gradually increases the span until the spread drops below a desired threshold, e.g., 5%. The control system then uses this span to compute all of the derivative estimates.

In some cases, the control system may determine that jerk cannot be accurately estimated, and, in this case the control system uses a second-order polynomial and three time/position pairs rather than the third-order polynomial described in equation (13) and four time/position pairs. The derivatives are evaluated at the desired motion state time, which is at a time centered with respect to the selected samples 1201. The derivatives, together with time at which they are evaluated, and modulation signal and current value, form a single motion state 1203.

In another method, all or many pairs within a selected interval 1201 of the desired sample time are used; for example, all pairs within −2 and +2 milliseconds. These time/position pairs are then fit to the polynomial (13) using a least-squares fit to determine the coefficients, and then use equation (14) as before to determine the derivatives of position.

Fitting a polynomial is known to be a poorly-conditioned numerical problem, and so to improve the accuracy of the solution, a data preconditioning technique is used. In this technique, an offset is subtracted from each time value in the set of selected samples, and the result multiplied by a scale factor to produce a set of times that has approximately zero mean and variance equal to 1. The offset that is subtracted from each time value in a selected set of samples is the time that will be associated with the resulting motion state. In a preferred embodiment, this time (and hence the offset) coincides with the middle-most time in the sample set. For example, referring to FIG. 12 again, in the first set of samples 1201, the offset would be the value of the evaluation time (and the middle-most value in the set), $t_5$. The preconditioned sample time may be expressed according to the following equation:

$$t_i' = (t_i - t_0) S \tag{16}$$

where $t_0$ is the evaluation time, and S is the inverse of the standard deviation of the times. Using preconditioned data values, the coefficients of the polynomial in equation (13) are computed with respect to t'; and, when evaluated at t0, the derivatives in equation (14) become:

$$v = k_1 S$$
$$a = 2 k_2 S^2$$
$$j = 6 k_3 S^3 \tag{17}$$

In one experiment, the above preconditioning technique reduced the condition number of the input matrix (for the case using the SVD least-squares fit method) by eight orders of magnitude.

Once the derivatives for a motion state have been computed (i.e., velocity, acceleration, and jerk), the corresponding motor control signal, e, is computed. Since this embodiment uses a constant-voltage power supply, the control system 1000 uses the recorded modulation signal (signal 1006) as the value of the motor control signal.

Typically there is a time delay of approximately two servo periods between corresponding modulation signal recordings and position pairs. This is because at a given servo interval, the position and time read from the encoder interface unit 1017 were recorded at the end of the previous interval. Additionally, the modulation signal computed during the servo interval will not be applied to the motor until the following interval, when the new PWM duty cycle takes effect. Thus the servo record for a particular interval includes a time/position pair from the previous interval and a modulation signal value for the next interval in the future. Therefore, the control system computes a "shifted time" equal to the sum of the motion state time (e.g., $t_5$, $t_{10}$, $t_{15}$ in FIG. 12) and an estimated time shift value of two servo periods, to compensate for this delay. The recorded modulation signal samples are then searched to find two values whose times bracket the shifted time, and a motor control signal value is computed by linear or polynomial interpolation.

A value of current associated with the motion state is computed in the same way as just described for modulation signal. However, the time shift is not employed, since the current value was recorded, not commanded, during the same interval, and hence its time of recording is very close to the time at which position was recorded.

Thus a single motion state 1203 is computed and includes a position value and its derivatives, a motor control signal value, and a current value, for a single time instant. This process 1202 is repeated for successive motion state times until a set of states sufficient to estimate the coefficients of the motor model equations (9) and (10) is obtained.

The control system estimates the coefficients for the motor model equations by selecting a set of motion states. For example, the control system may select 100 motion states more or less uniformly spaced within the aforementioned 300 millisecond duration of the voltage signal. The motor model coefficients are then solved via a direct least-squares method. The overconstrained equation to be solved, in matrix form, containing n motion states, is:

$$\begin{bmatrix} 1 v_1 a_1 j_1 \operatorname{sgn} v_1 \\ \cdots \\ 1 v_n a_n j_n \operatorname{sgn} v_n \end{bmatrix} \begin{bmatrix} k_0 \\ k_v \\ k_a \\ k_j \\ k_f \end{bmatrix} = \begin{bmatrix} e_1 \\ \cdots \\ e_n \end{bmatrix} \quad (18)$$

$$A \cdot x = b$$

The above matrix equation is solved in a least-squares sense to determine the values of the model coefficients. In a preferred embodiment, the controller uses the SVD (Singular Value Decomposition) method to solve the matrix equation, however, other embodiments may employ other mathematical methods known in the art to solve the matrix equation.

In a preferred embodiment, the numerical robustness of the solution is improved by "preconditioning" the data in the A matrix. The velocities, accelerations, and jerks have extremely large magnitudes, and, accordingly, the accuracy of the solution may be compromised. To precondition the data, the controller subtracts an offset from each derivative and multiplies the result by a scale factor, so that each column of the A matrix has zero mean and variance equal to 1. The offset is the mean of the corresponding column values, and the scale factor is the inverse of the standard deviation of the column values. For example, each preconditioned velocity term is $v_i' = (v_i - O_v) S_v$, where $O_v$ is the mean velocity, and $S_v$ is the inverse of the standard deviation of the velocities. This creates the following matrix equation to solve for scaled coefficients:

$$\begin{bmatrix} 1 (v_1 - O_v) S_v (a_1 - O_a) S_a (j_1 - O_j) S_j \operatorname{sgn} v_1 \\ \cdots \\ 1 (v_n - O_v) S_v (a_n - O_a) A_s (j_n - O_j) S_j \operatorname{sgn} v_n \end{bmatrix} \begin{bmatrix} k_0' \\ k_v' \\ k_a' \\ k_j' \\ k_f' \end{bmatrix} = \begin{bmatrix} e_1 \\ \cdots \\ e_n \end{bmatrix} \quad (19)$$

This equation can be solved more reliably than the matrix equation (18) without preconditioning. In some tests, the condition number (a measure of numerical reliability or ill-conditioning) was reduced by 9 or 10 orders of magnitude by preconditioning the data.

Once the preconditioned matrix equation is solved to achieve the scaled coefficients, the model coefficients are calculated by the following equations:

$k_v = S_v k_v'$ $k_a = S_a k_a'$ $k_j = S_j k_j'$ $k_f = k_f'$ $k_0 = k_0' - O_v k_v - O_a k_a - O_j k_j$ (20)

Note that using the above model estimation automatically compensates for variations in the wiring connections between the controller and motor. For example, if encoder wires (i.e. wires within connection 1009 shown in FIG. 10) or motor phase wires (i.e. wires within connection 1005 shown in FIG. 10) are exchanged, this results in a reversal of the normal direction of motion. If this occurs, then all of the coefficients $k_v$, $k_a$, $k_j$ will have a negative sign, and the sign of the modulating signal (i.e. signal 120 shown in FIG. 1) will be consistent with the direction of rotation, so that a stable, accurate motion is always obtained.

The coefficients of the current model equation (10) (i.e., $m_v$, $m_a$, $m_f$, and $m_0$) are estimated in the same way, using the same set of motion states. This time, however, the recorded current values are used in place of the motor voltage, and form the matrix equation:

$$\begin{bmatrix} 1 v_1 a_1 \operatorname{sgn} v_1 \\ \cdots \\ 1 v_n a_n \operatorname{sgn} v_n \end{bmatrix} \begin{bmatrix} m_0 \\ m_v \\ m_a \\ m_f \end{bmatrix} = \begin{bmatrix} i_1 \\ \cdots \\ i_n \end{bmatrix} \quad (21)$$

The above equation is solved to obtain the coefficients $m_v$, $m_a$, $m_f$, and $m_0$ using the same techniques described above.

The above procedure can be used to estimate a model based on the record of any suitable motion, and is not restricted to the result of an open-loop learning signal. Any motion having certain desired characteristics, for example, containing a period of acceleration, can be used to estimate a model. In this way, the method can be used to continually update or automatically fine-tune the model (as shown in block 204 in FIG. 2) and other control system parameters that depend on the model, such as the closed-loop controller.

In some cases, one or more of the parameters of the motor model cannot be reliably estimated. For example, if a profile does not contain both positive and negative velocities, the constant and friction coefficients $k_0$ and $k_f$ are redundant and cannot be independently estimated. In this case only one is used and the result is later allocated using the proportions that existed in the previous motor model, or, in some cases, assigned to only one coefficient.

In some cases the jerk coefficient $k_j$ cannot be reliably estimated; this condition can be detected if $k_j$ does not have the same sign as $k_v$ and $k_a$. In this case, the input matrix equation (18) is modified to remove jerk terms and the fit performed again. In this case, or in any case where the controller may determine that jerk is not a significant factor, the polynomial (13) may be changed to second-order, simplifying and speeding up the computation of position derivatives.

Automatic Closed-Loop Controller Design

After the motor model has been estimated with a satisfactory degree of accuracy, the control system continues in the self-commissioning process to automatically design the closed-loop control. Referring again to FIG. 10, the closed-loop control 1008 includes a state-space controller that combines a proportional current controller 1019 with a position PID controller 1020. The PID (Proportional-Integral-Derivative) controller has the following control law:

$$u = k_p e_p + k_i \int e_p dt + k_d \frac{de_p}{dt} \quad (22)$$

Where u (signal 1018) is the correction signal of the PID controller, and $e_p = r_p - p$ is the position error 1014, equal to the reference (commanded) position $r_p$ (signal 1011) minus the actual position p (signal 1010). The current loop multiplies the current error $e_c=r_c-i$ (signal 1015), which is the difference between the current reference value $r_c$ (signal 1021) and the current feedback i (signal 1012), by a current gain value $k_c$ to produce correction signal 1016. The current reference values 1021 are supplied to the current feedback loop by evaluating the motor current equation (10) at each servo processing interval. The PID correction signal 1018 and current loop correction signal 1016 are summed to produce the closed-loop control correction signal 1013.

For the purposes of closed-loop control design the control system 1000 ignores nonlinear model terms. By doing so, the transfer function (position-command to position) of the closed-loop motor system in Laplace transform space is:

$$H(s) = \frac{k_d s^2 + s k_p + k_i}{k_j s^4 + (m_a k_c + k_a) s^3 + (m_v k_c + k_v + k_d) s^2 + s k_p + k_i} \quad (23)$$

The control system 1000 computes the controller gains $k_p$, $k_i$, $k_d$, and $k_c$ to provide an acceptable response by placing the poles (roots of the denominator polynomial in equation (23)) in a desirable configuration. Note that the use of the state-space control formulation allows the control system to place the poles arbitrarily. One such desirable configuration is a "Butterworth" arrangement, whereby all the poles are placed at a constant radius ω from the origin of the s-plane, equally spaced, with a specified "spread", or maximum angle θ with respect to the negative real axis. In this case the controller gains are computed as follows:

$$k_c = \frac{2\omega k_j \left(\cos\theta + \cos\frac{\theta}{3}\right) - k_a}{m_a} \quad (24)$$

$$k_d = 2k_j \left(2\cos\theta\cos\frac{\theta}{3} + 1\right)\omega^2 - k_c m_v - k_v$$

$$k_p = 2k_j \left(\cos\theta + \cos\frac{\theta}{3}\right)\omega^3$$

$$k_i = k_j \omega^4$$

Many other configurations are possible, as another example, a pair of complex poles at ω and two real poles at higher frequencies.

In one embodiment, the control system 1000 uses a spread θ of ±20°. The value of the frequency ω is chosen based on desired values for controller resolution. Controller resolution is defined as the minimum nonzero correction signal (signal 1013) that can be achieved for a given set of gains. In a digital control system, feedback quantities, both position and current, are obtained as discrete integer quantities, thus, therefore, in this case the smallest possible nonzero position error equals one count. Multiplying this error by $k_p$ results in the smallest nonzero correction signal. For example, if $k_p$=0.5, then the smallest correction signal is 50% of maximum (recall that the units of the correction signal, as with the modulation signal, are expressed in terms of "fraction of maximum output"); this produces an extremely coarse resolution with only two possible values of (positive) correction signal. When the resolution is coarse, the controller approximates the behavior of a relay feedback element which is known to cause instability; this is the reason why the control system requires a certain (fine) level of controller resolution. A specified level of resolution therefore defines a maximum value for the proportional gains.

Thus, whatever configuration the control system uses to calculate the gains, the control system can directly assign the proportional gains to values of desired resolution. In this embodiment, the control system uses default resolution values of 1%, and thus sets $k_p$=0.01 and $k_c$=0.01. The control system can then compute corresponding values for frequency ω from equation set (24), as follows:

$$\omega_c = \frac{k_c m_a + k_a}{2k_j\left(\cos\theta + \cos\frac{\theta}{3}\right)} \quad (25)$$

$$\omega_p = \left(\frac{k_p}{2k_j\left(\cos\theta + \cos\frac{\theta}{3}\right)}\right)^{1/3}$$

The control system then selects the smaller frequency value of the two choices $\omega_c$ and $\omega_p$, and computes the closed-loop control gains using equation set (24). This technique provides the desired resolution for the proportional terms, but as will be described below, the overall desired closed-loop control resolution is achieved by separate means, without modifying the value of ω chosen using equation set (25).

The desired resolution for the integral term controlled by $k_i$ is achieved by modifying the controller sampling rate. To illustrate this, consider the following example. Suppose that a value for ω has been computed by the above method (i.e. derived from proportional gains set to a predetermined resolution). The integral gain $k_i$, in units of output-fraction per count-second, is computed using equation set (24); suppose it's equal to 40, and the controller servo executes 2000 times per second (i.e. servo processing interval equals 500 microseconds). At each servo interval, the control system computes the integral portion of equation (22) in the following way:

$$u_{i_k} = u_{i_{k-1}} + k_i' e_{p_k} \quad (26)$$

where $e_{P_k}$ is the position error (in units of counts) for the current interval, $u_{i_k}$ is the correction output of the integral term for the current interval, and $u_{i_{k-1}}$ is the correction output of the integral term for the previous interval. The integral gain $k_i'$ has units of output-fraction per count-interval, and is therefore scaled using the servo interval, $k_i'=k_i T_s$ where $T_s$ is the interval in seconds per interval. In this example, then, $T_s$ equals 0.0005, and $k_i'$ therefore equals 0.02. The minimum value of position error (i.e., one) in this case will increase the correction output from the previous interval by an amount (as an output fraction) of 2%, which is twice the desired resolution. The desired resolution in this case can be achieved by doubling the servo rate to 4000. Then $T_s$ equals 0.00025, and $k_i'$ equals 0.01; this was achieved without modifying the value of $k_i$. It is apparent, then, that this control system is able, if necessary, to modify its servo sampling rate during the control design portion of self-commissioning. Experiments have shown that this is almost never necessary, however. The computed value of $k_i'$ normally provides far higher resolution than the proportional term(s) $k_p$ and $k_c$. This is not the case for the derivative term, however.

The derivative term of equation (22) is formed by multiplying a scaled version of the derivative gain $k_d$ by an estimate of the derivative of the position error, as in the following equation:

$$u_{d_k} = k_d' d_{n_k} \quad (27)$$

where $u_{d_k}$ is the derivative term for the current servo interval, $k_d'$ is the scaled derivative gain, and $d_{n_k}$ is the derivative estimate for the current servo interval. The derivative estimate may be calculated using the following equation:

$$d_{n_k} = e_{p_k} - e_{p_{k-n+1}} \qquad (28)$$

where $e_{p_k}$ is the position error for the current interval, and $e_{p_{k-n}}$ is the position error for n intervals in the past. Often, n=2, and in this case $e_{p_{k-n+1}}$ is the position error for the previous interval; however, larger values of n are sometimes used when the servo rate is high. The minimum correction output is that obtained for a step change of one count in position error; the output, and therefore the resolution of the derivative term, is the value of $k_d'$. The gain $k_d'$ used in the servo loop is scaled in an analogous manner to that described above for the integral gain, as follows:

$$k_d' = \frac{k_d}{T_s(n-1)} \qquad (29)$$

It is apparent from the above equation that the resolution of the derivative term (i.e., the value of $k_d'$) decreases as the servo rate is increased. To raise the derivative resolution (i.e. lower the value of $k_d'$), the servo rate can be decreased (corresponding to a larger value of $T_s$) or the value of n can be increased. Neither of these is always desirable or achievable, however. Most control systems normally set a conservative lower limit to the servo rate. For example, the control system may determine that the servo rate must be at least 25 times the closed-loop bandwidth (i.e., $\omega$); in this case, the maximum allowable value for $T_s$ is calculated as follows:

$$T_s = \frac{2\pi}{25\omega} \qquad (30)$$

The controller cannot use a larger value than this maximum value for $T_s$ in order to increase derivative resolution. Using a large value of n effectively low-pass-filters the derivative, but if n is too large, then the filter break-point approaches the frequency $\omega$ and the filter delay increases, both of which can degrade closed-loop control performance.

This controller solves this problem by applying a boxcar derivative function to compute the derivative estimate, filter it, and amplify the result. The boxcar derivative function of length n is defined as:

$$d_{n_k} = e_{p_k} + \ldots + e_{p_{k-\frac{n}{2}+1}} - e_{p_{k-\frac{n}{2}}} - \ldots - e_{p_{k-n+1}} \qquad (31)$$

if n is an even number, or:

$$d_{n_k} = e_{p_k} + \ldots + e_{p_{k-\frac{n-1}{2}+1}} - e_{p_{k-\frac{n-1}{2}}} - \ldots - e_{p_{k-n+1}} \qquad (32)$$

if n is odd. For example, a boxcar derivative of length six is computed as:

$$d_{6_k} = e_{p_k} + e_{p_{k-1}} + e_{p_{k-2}} - e_{p_{k-3}} - e_{p_{k-4}} - e_{p_{k-5}} \qquad (33)$$

and the boxcar derivative of length five is computed as:

$$d_{5_k} = e_{p_k} + e_{p_{k-1}} - e_{p_{k-3}} - e_{p_{k-4}} \qquad (34)$$

Note that the boxcar derivative of length two is equivalent to the traditional technique of equation (28) for n=2.

The derivative term is now computed as follows:

$$u_{d_k} = k_d'' d_{n_k} \qquad (35)$$

In the traditional technique defined by equations (27) and (28), the output (of the difference in position error) is amplified by a factor of n−1; this is reflected in equation (29). The amplification factor can be computed by computing the output produced by a sequence of position errors with constant slope (i.e., derivative) equal to R counts per servo interval. Using the boxcar derivative function of equation (31), however, it is apparent that the amplification factor is now approximately equal to $n^2/4$ (this applies exactly when n is even). Thus the derivative gain $k_d''$ used by the servo loop can be reduced by this same factor:

$$k_d'' = \frac{4}{n^2 T_s} k_d \qquad (36)$$

For the same length (and hence, approximately equal filter break frequency) n, the boxcar derivative has much larger amplification factor. For example, for n=8 the boxcar derivative has twice the amplification of the traditional method; for n=16, the amplification is about four times as great. This allows the controller to use a reduced value for filter length n compared to the traditional method. The boxcar derivative is also extremely efficient to compute; for n even, the computation is as follows:

$$d_{n_k} = d_{n_{k-1}} + e_{p_k} + e_{p_{k-n}} - 2e_{p_{k-\frac{n}{2}}} \qquad (37)$$

To achieve the desired correction output resolution for the derivative term, then, the control system first (and optionally) adjusts the value of $T_s$ to the largest value deemed feasible (e.g. that set by equation (30)). The value of $T_s$ is also not allowed to be larger than the value specified by the integral term resolution, as described above. Now the filter length is defined by:

$$n = \sqrt{\frac{4k_d}{T_s k_d''}} \qquad (38)$$

Where $k_d''$ is this case has the value of the desired resolution (e.g., 0.01). The value of n is then increased to be the next integral even number.

The control system may sometimes find that the choice of frequency using the above method produces a negative value for current gain $k_c$. This can occur when encoder resolution is low or when the electrical time constant is small. In this case the control system sets $k_c=0$. However, now the control system cannot place poles arbitrarily, and the control system proceeds to place a complex pair at the value of $\omega_p$ computed using equation (25) and the spread $\theta$, and a second pair at a spread $\theta/3$; in this case the frequency of the second pole pair is given by:

$$\omega_2 = \frac{\frac{k_a}{k_j} - 2\omega_p \cos\theta}{2\cos\frac{\theta}{3}} \qquad (39)$$

and the resulting gains are:

$$k_p = 2k_j(\cos\theta\Omega_p\Omega_2^2 + \cos\theta/3\Omega_p^2\Omega_2)$$

$k_i = k_j \Omega_2^2 \Omega_p^2$ $k_d = k_j(\Omega_p^2 + \Omega_2^2 + 4\cos\theta\cos\theta/3\ \Omega_p\Omega_2) - k_v)$ (40)

If the value of $\omega_2$ is less than $\omega_p$, this indicates that resolution for the proportional term is not a constraint, and in this case a solution for the gains is found in which $\omega_2 = \omega_p$. Note that when $k_c = 0$, the entire current loop is disabled, and there is no further need to measure or record current feedback (signal 1012 shown in FIG. 10), nor to estimate or use the current model equation (10). This forms an alternate embodiment of a lower-cost control system that does not provide current feedback.

The above closed-loop control design procedure leads naturally to a system that has good transient response characteristics and is achieved without moving the motor.

As noted above, sometimes a reliable estimate for the jerk coefficient $k_j$ is not obtained. When this happens, for the purposes of closed-loop control design the control system simply uses the value of zero, and computes a closed-loop control based on three poles equally spaced around a circle. Additionally, the value of $k_j$ may be very small, which leads to excessive values for the derivative gain ($k_d$) even when the derivative gain is computed using a long boxcar derivative function. In this case the pole placement design is changed from two complex pole pairs to a single pair, plus a real pole at the same distance (thus forming three poles on a circle), plus a real pole at a much higher frequency.

Once the control system has computed a closed-loop control design (i.e., computed the gains), the control system tests the design by enabling control with the computed controller parameters, and then commanding a series of small step responses. The immediately following time history of the position error (for a time period of, e.g., 0.5 seconds) is analyzed; if the response is too oscillatory, the frequency $\omega$ is reduced (e.g. by multiplying it by 0.85), the spread $\theta$ is also optionally reduced, and new closed-loop control gains are computed using equations (24), (40), or other equations that may apply for the chosen pole configuration, and the step response check repeated, until the response is acceptable.

The control system may optionally repeat the above closed-loop control design sequence for a number of alternate closed-loop control designs. For example, the controller may anticipate the need to perform both step and scan motion functions; a PID controller may be preferred when responding to a step motion command, but a PD controller may be preferred when responding to a scan command. Therefore, one or more alternate controllers, such as a PD controller, may be designed at this time, as part of the self-commissioning process. The computed parameters (e.g. gains) of alternate controllers are stored so that an alternate controller may be enabled and operated at a later time.

As described earlier, the motor position may be offset in time from that corresponding to the feedforward signal, to compensate for the natural delay in servo processing. Therefore, the reference values presented to the feedback controller (signal 117 in FIG. 1) correspond to a time (e.g. 357 microseconds) later than the feedforward value (signal 119 in FIG. 1).

Embodiment for Brushless Motors

An embodiment for brushless (electronically commutated) motors is now described. This type of motor is described by the DC brush motor model described in equations (9) and (10), however, in this case the commutator (block 123 shown in FIG. 1) is used, and the parameters for its commutation function(s) must also be obtained or estimated. All commutation functions repeat at a given period, and have a position offset. For convenience, the control system defines a universal rotation function that, given a motor position p, returns a value between zero and one indicating the motor's position within the commutation interval:

$$C(p) = \frac{(p - c_0) \bmod c_p}{c_p}$$ (41)

Particular commutation functions can be defined in terms of the function C; and thus the phase-finding step of the self-commissioning process (block 301 shown in FIG. 3) involves estimating the parameters $c_0$ and $c_p$. There are two common types of brushless motors, each with its own commutation function:

1. Trapezoidal-EMF waveform, switched commutation, typically referred to simply as brushless DC motors. These motors may sometimes supply Hall sensor outputs, one for each phase, to serve as commutation inputs. The commutation function simply switches the specified modulation signal (signal 120 shown in FIG. 1) into different phases at different positions:

$$e_A = \begin{cases} e, & 0 \le C < 1/3 \\ -e, & 1/2 \le C < 5/6 \\ 0 & \text{otherwise} \end{cases}$$ (42)

$$e_B = \begin{cases} e, & 1/6 \le C < 1/2 \\ -e, & 2/3 \le C < 1 \\ 0 & \text{otherwise} \end{cases}$$

$$e_C = \begin{cases} e, & 1/3 \le C < 2/3 \\ -e, & C > 5/6 \text{ or } C \le 1/6 \\ 0 & \text{otherwise} \end{cases}$$

2. Sinusoidal-EMF waveform, sinusoidal commutation, typically referred to as PMSM (Permanent Magnet Synchronous Motor) or brushless AC motor. In this case the commutation function is sinusoidal:

$e_A = e \cdot \sin(2\pi C)$ $e_B = e \cdot \sin(2\pi C + 2\pi/3)$ $e_C = e \cdot \sin(2\pi C + 4\pi/3)$ (43)

The commutation function parameters are estimated for the particular motor type as described above.

Once the commutation function parameters have been estimated, the remainder of the self-commissioning process described in the DC brush motor embodiment is carried out, in exactly the same way as described above.

A number of embodiments of the invention have been described. Nevertheless, it will be understood that various modifications may be made without departing from the spirit and scope of the invention. For example, the control system may use a modulator that controls current rather than one which controls voltage. The computation of trajectory profiles may be performed using closed-form mathematical formulae, rather than the iterative logic illustrated in FIG. 4.

Trajectory planning may be accomplished directly in the modulation signal domain, that is, the trajectory planning algorithm may directly construct a voltage waveform (rather than constructing an acceleration waveform), adjusting the voltage waveform to satisfy the motion constraints. This technique may be advantageously used in the context of optimum discontinuous control, where the output fraction is set to either +1 or −1 to effect, for example, step motion. In this method, the motor model is also used to help design the applicable closed-loop controller (e.g. via computing the parameters of a switching curve), said controller implicitly including the motion planner.

Trajectory planning may use one or more trapezoid acceleration pulses whereby jerk, maximum acceleration, and maximum velocity are used as parameters instead of pulse time, peak acceleration, and acceleration fraction.

The motor control system may be adapted for cases in which the motor control signal is not directly proportional to the modulation signal. In the case of an unregulated DC voltage source, the control system may apply the motor control signal by measuring the instantaneous input voltage and adjusting the modulation signal accordingly. The control system may record the motor control signal by recording the value of both the modulation signal and the input voltage, so that the effective motor control signal can be computed. For example, a voltage source may provide a voltage that varies from 80 to 130 volts; in this case the maximum motor control signal is presumed to be 80 volts, since the maximum signal is preferably always available for application to the motor. The controller may apply a motor control voltage of 50% of maximum output (40 volts) by measuring the instantaneous input voltage and setting the modulation signal to the value required to produce 40 volts; e.g. 50% for an input voltage of 80 volts, 33.3% for 120 volts, etc. The controller computes a recorded value for the motor control signal by recording both modulation signal and input voltage; if the recorded value of the modulation signal is 25% and the recorded value of input voltage is 90 volts, then the computed motor control signal is 22.5 volts; this may be converted to the controller's output-fraction units by dividing by 80 volts, to produce a computed value of the recorded motor control signal of 28.1%.

A similar method may be used in the case of an AC input voltage source. In this case the control system may measure the instantaneous voltage across all available phases, then it will both select the phase lines to modulate and adjust the modulation signal, in order to provide the correct commanded voltage to the motor.

The control system may use a PID closed-loop control in which the derivative term is computed by providing a velocity setpoint $r_v$ from the trajectory generator (said setpoint is already computed in order to compute the feedforward), estimating the actual velocity v during each servo processing interval, computing the velocity error $e_v = r_v - v$ and computing the derivative term as $k_d(r_v - v)$.

The closed-loop control (shown as element 111 in FIG. 1) may be any type of closed-loop controller known in the art and is not limited to the state-space closed-loop controller illustrated in FIG. 10.

The control system may use any known motor model for the particular type of motor, for example, the motor model equation (9) shown above may be augmented with a position-dependent term, e.g. $+k_p p$, or other terms. This type of motor model may be utilized to model systems that might include position-dependent forces (pushing on a spring, for example).

The control system may use a describing function other than a polynomial for computing derivatives of position. Any describing function that relates position to time, and is differentiable in order to compute position derivatives, may be used. For example, a sum of sinusoids can be used.

The control system may be adapted to receive and utilize other forms of position feedback than feedback from an optical encoder. For example, an ADC reading of a resolver can be obtained, along with the exact time at which its input sample-and-hold circuit was latched, to provide a corresponding position/time pair. A magnetic encoder or potentiometer can also be used.

The control system may be adapted to use a state estimator or observer to estimate position and/or current in cases where enhanced accuracy of position or current feedback may be obtained (e.g. when current measurements are determined to be noisy). In addition to using the state estimator, information (i.e. motor model equation coefficients) obtained during the self-commissioning process may be used to design one or more state estimators, in a manner analogous to the automatic design of a closed-loop controller described above.

The control system may be adapted to incorporate an estimator or observer for additional motor states, e.g. a torque disturbance estimator, and the motor model used to design such estimators.

The control system may use a technique to update the motor model and other control system parameters (shown as element 204 in FIG. 2) that is different than the model estimation technique used for self-commissioning and described above. For example, an auto-regression estimator or iterative-learning-controller may be used for this element. The control system may use information derived from the motor model coefficients obtained during the self-commissioning process to design the element(s) used for model and controller update.

The control system may use a variety of commutation functions not described above, that may be advantageous for certain motors. For example, a commutation function may be piecewise-linear or a sum-of-sinusoids.

The control system may be adapted to use functions other than the boxcar derivative function described above, to compute the derivative estimate used by a PID or PD control element. For example, convolution with the first derivative of a Gaussian, a Lanczos differentiator filter, or the Kaiser window technique, may be used.

The functions of the control system may be distributed among one or several different computers. For example, the trajectory generator, closed-loop control, and encoder interface may be realized as a stand-alone low-cost module, and the model fitting, trajectory generation, and other functions may be realized as a software module that runs on the user's computer (e.g., personal computer or industrial controller). The modules can be implemented in any of the suitable technologies known in the art, e.g. fixed semiconductor logic chip(s), FPGA (Field-Programmable Gate Array), DSP (Digital Signal Processor), and microprocessor. The modules can be implemented separately in many combinations on such hardware modules, said modules then interconnected by means known in the art, e.g. circuit board connection, PCI bus, VME/VXI bus, RS-232, Ethernet, DeviceNet, CAN (Controller Area Network).

The control system may be configured to attach temporarily to a motor/load/modulator system in order to perform the self-commissioning function(s) as described above. The controller can then, instead of directly performing the motion control functions, compute and transmit parameters (both for closed-loop control, e.g. gains, and for trajectory planning and generation) for storage or use on a separate, target, motion controller. For example, a self-commissioning instrument could be made for a manufacturer's existing motion controller in such a way. Such an instrument can add only the required hardware functions (e.g. encoder interface and/or servo data recording) as a plug-in module to the target controller, or it can be a separate instrument to which the motor and modulator are connected for the duration of self-commissioning. In such a case the parameters would also be converted to a form appropriate for the target controller, and could also be stored implicitly in the form of programs or other modules that can be transmitted to a target controller when desired.

Accordingly, other embodiments are within the scope of the following claims.

What is claimed is:

1. A method comprising the machine-implemented steps of:
   performing a self-commissioning process to compute a motor model that relates a motor control signal applied by a controller to a motor to the motion of the motor, wherein the self-commissioning process is automatically performed in response to receipt of a first user input and the motor model is computed without requiring a second user input;
   determining a set of motion profile parameters that specify a motor control signal based on the motor model such that a motion resulting from application of a motor control signal specified by the motion profile parameters does not exceed any constraint values of a constraint value set; and
   supplying the motion profile parameters to a controller to generate the motor control signal specified by the motion profile parameters.

2. The method of claim 1 wherein the constraint value set includes one or more constraint values each limiting operation of the motor.

3. The method of claim 2 wherein the constraint value set comprises at least one of the following: maximum velocity, maximum acceleration, maximum current, maximum root-mean-square (RMS) current, or maximum RMS acceleration.

4. The method of claim 1 further comprising:
   minimizing a duration of the motion resulting from the application of the motor control signal.

5. The method of claim 1 further comprising:
   modifying the set of motion profile parameters to a predetermined format; and
   wherein supplying the motion profile parameters to a controller comprises supplying the modified set of motion profile parameters to a controller to generate the motor control signal specified by the motion profile parameters.

6. The method of claim 1 further comprising:
   selecting an acceleration pulse form, and wherein the set of motion profile parameters define an acceleration pulse of the selected acceleration pulse form.

7. The method of claim 1 further comprising:
   selecting a motion plan algorithm, and wherein determining a set of motion profile parameters is also based on the selected motion plan algorithm.

8. The method of claim 1, wherein the set of motion profile parameters comprise:
   a sequence of acceleration pulses, each pulse specified in terms of duration and peak acceleration.

9. The method of claim 8, wherein the sequence of acceleration pulses is any one of the following types of accelerations pulses: quadratic, harmonic, trapezoidal, piecewise linear, or cycloidal.

10. The method of claim 1, wherein the set of motion profile parameters comprise a set of peak jerk, peak velocity, and peak acceleration values.

11. The method of claim 1, wherein determining a set of motion profile parameters based on the motor model comprises:
    selecting an initial set of motion profile parameters;
    computing one or more signals using the initial set of motion profile parameters;
    comparing the computed one or more signals to one or more corresponding values of the constraint value set;
    if the computed one or more signals are not within a predetermined amount of the one or more corresponding values of the constraint value set, then iteratively selecting other sets of motion profile parameters until a set of motion profile parameters produces one or more signals that are within a predetermined amount of the one or more corresponding values of the constraint value set.

12. The method of claim 1, further comprising receiving a command to move to a specified position.

13. The method of claim 1, further comprising receiving a command to move with a specified velocity.

14. The method of claim 1, further comprising receiving a command to move to a specified position at a specified velocity.

15. The method of claim 7, wherein the motion plan algorithm comprise any one of the following: a pulse-cruise-pulse algorithm, a balanced pulse-cruise-pulse algorithm, or a balanced pulse-pulse algorithm.

16. A controller for an electric motor having a position-feedback device that provides position feedback information to the controller, the controller comprising:
    a motor model computation module configured to compute a motor model equation that relates controller output to motion of the motor; and
    a trajectory planning module configured to receive a motion function command and, in response to receiving the motion function command, compute a set of motion profile parameters based on the motor model equation and a predetermined constraint value set, such that the motion resulting from application of a motor control signal specified by the set of motion profile parameters does not exceed any of the constraint values in the constraint value set.

17. The controller of claim 16 wherein the motor control signal comprises a signal that is within 5% of a constraint value of the set.

18. The controller of claim 16 further comprising:
    a trajectory generator module configured to receive the motion profile parameters and generate a signal to cause the motor to execute the motion function specified in the motion function command.

19. The controller of claim 18 further comprising:
    a closed-loop control device configured to calculate position errors during execution of the motion function command and adjust controller output to compensate for calculated errors.

20. The controller of claim 16 further comprising:
    a position-measuring interface device configured to receive the position feedback information and record both a change in position and an indication of time at which the change of position occurred.

21. The method of claim 1, wherein the self-commissioning process is automatically performed in response to a first receipt of a motion function command.

22. The method of claim 1, wherein the self-commissioning process is performed in response to receipt of a self-commissioning initiation command.

23. The method of claim 1, wherein the self-commissioning process comprises:
    applying a control signal that causes the motor to change position over a period of time;
    recording the control signal over a period of time;
    recording position information of the motor over a period of time resulting from the application of the control signal;

estimating a plurality of derivatives of position based on the recorded position information, wherein the plurality of derivatives includes both a first order derivative and a second order derivative; and computing a motor model comprising the step of fitting the plurality of derivatives of position into a motor model equation that relates the control signal to a motion of the motor.

24. The method of claim 1, wherein the motor is selected from the group consisting of DC brush, DC brushless, AC brushless, and inductance motors.

25. The method of claim 1, further comprising receiving a command to perform a motor function.

* * * * *